(12) United States Patent
Kang

(10) Patent No.: US 10,531,228 B2
(45) Date of Patent: Jan. 7, 2020

(54) APPROACHING USER DETECTION, USER AUTHENTICATION AND LOCATION REGISTRATION METHOD AND APPARATUS BASED ON RF FINGERPRINT

(71) Applicant: SK Planet Co., Ltd., Gyeonggi-do (KR)

(72) Inventor: Kichon Kang, Seoul (KR)

(73) Assignee: SK PLANET CO., LTD., Seongnam-si, Gyeonggi-do (KR)

( * ) Notice: Subject to any disclaimer, the term of this patent is extended or adjusted under 35 U.S.C. 154(b) by 283 days.

(21) Appl. No.: 15/336,323

(22) Filed: Oct. 27, 2016

(65) Prior Publication Data

US 2017/0180935 A1  Jun. 22, 2017

(30) Foreign Application Priority Data

Dec. 16, 2015 (KR) .................. 10-2015-0179803
Dec. 29, 2015 (KR) .................. 10-2015-0188299
Dec. 29, 2015 (KR) .................. 10-2015-0188305

(51) Int. Cl.
| | |
|---|---|
| H04L 29/06 | (2006.01) |
| H04W 4/02 | (2018.01) |
| H04W 8/20 | (2009.01) |
| H04W 12/06 | (2009.01) |
| H04W 8/00 | (2009.01) |

(52) U.S. Cl.
CPC .......... *H04W 4/023* (2013.01); *H04W 4/027* (2013.01); *H04W 8/20* (2013.01); *H04W 12/06* (2013.01); *H04W 8/005* (2013.01)

(58) Field of Classification Search
CPC ...... H04L 63/08; H04W 12/06; H04W 4/023; H04W 4/027; H04W 8/20; H04W 8/005
See application file for complete search history.

(56) References Cited

U.S. PATENT DOCUMENTS

| | | | | |
|---|---|---|---|---|
| 7,049,933 B1* | 5/2006 | Koerner | ............... | G06K 7/0008 340/10.1 |
| 7,644,424 B2* | 1/2010 | Pedlow, Jr. | ............ | H04N 7/106 725/131 |
| 7,660,598 B2* | 2/2010 | Barnett | ............... | H04B 7/0608 455/522 |
| 8,229,415 B1* | 7/2012 | Chen | .................. | G06Q 30/0282 455/422.1 |
| 9,014,666 B2* | 4/2015 | Bentley | .................. | G06F 21/34 455/411 |
| 9,749,788 B2* | 8/2017 | Shen | ..................... | G01S 5/0205 |
| 9,807,724 B2* | 10/2017 | Titus | ..................... | H04W 64/00 |
| 2003/0214961 A1* | 11/2003 | Nevo | ..................... | H04L 12/66 370/401 |

(Continued)

*Primary Examiner* — Sher A Khan
(74) *Attorney, Agent, or Firm* — Fenwick & West LLP

(57) ABSTRACT

The present invention relates to an RF (radio frequency) fingerprint-based user authentication method, an approaching user detection method, a location registration method, and an apparatus for the same wherein there may be excellent effects in preventing a lost child, a missing elderly, a companion dog, etc. by utilizing the RF fingerprint, greater effects may be achieved in terms of security and safety compared to conventional fingerprint-based user authentication methods, and more accurate location registration of the wireless communications device for each store may be realized.

5 Claims, 20 Drawing Sheets

(56) References Cited

U.S. PATENT DOCUMENTS

| | | | |
|---|---|---|---|
| 2005/0025182 A1* | 2/2005 | Nazari | H04W 88/06 370/469 |
| 2006/0149580 A1* | 7/2006 | Helsper | G06Q 30/06 235/383 |
| 2006/0225936 A1* | 10/2006 | Kawazoe | B60T 7/16 180/167 |
| 2008/0259829 A1* | 10/2008 | Rosenblatt | H04M 1/7253 370/310 |
| 2009/0097414 A1* | 4/2009 | Yoon | G01C 21/3438 370/254 |
| 2010/0159951 A1* | 6/2010 | Shkedi | H04W 4/023 455/456.1 |
| 2011/0055577 A1* | 3/2011 | Candelore | H04L 9/32 713/176 |
| 2012/0017264 A1* | 1/2012 | Hanna, Jr. | H04W 4/029 726/3 |
| 2014/0006787 A1* | 1/2014 | Measson | H04W 12/04 713/171 |
| 2014/0051357 A1* | 2/2014 | Steer | H04L 63/0876 455/41.2 |
| 2015/0223027 A1* | 8/2015 | Ahn | G01S 5/0236 455/456.1 |
| 2016/0180068 A1* | 6/2016 | Das | G06F 21/32 726/7 |
| 2016/0234205 A1* | 8/2016 | An | H04L 63/0861 |
| 2017/0126648 A1* | 5/2017 | Bond | G06F 9/542 |
| 2017/0180935 A1* | 6/2017 | Kang | H04W 4/023 |

* cited by examiner

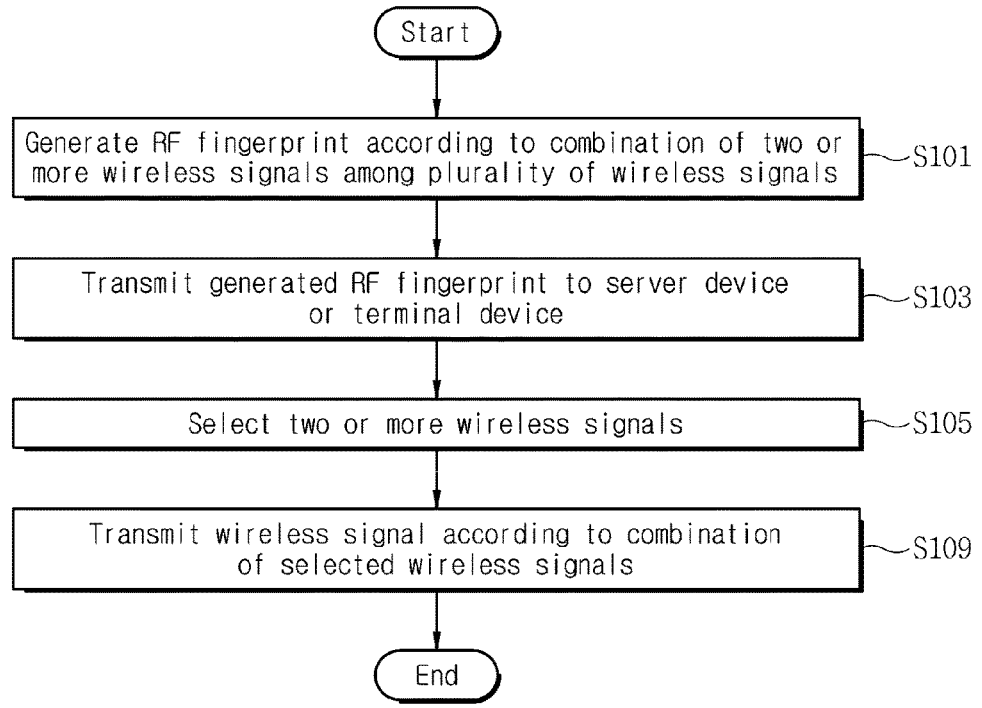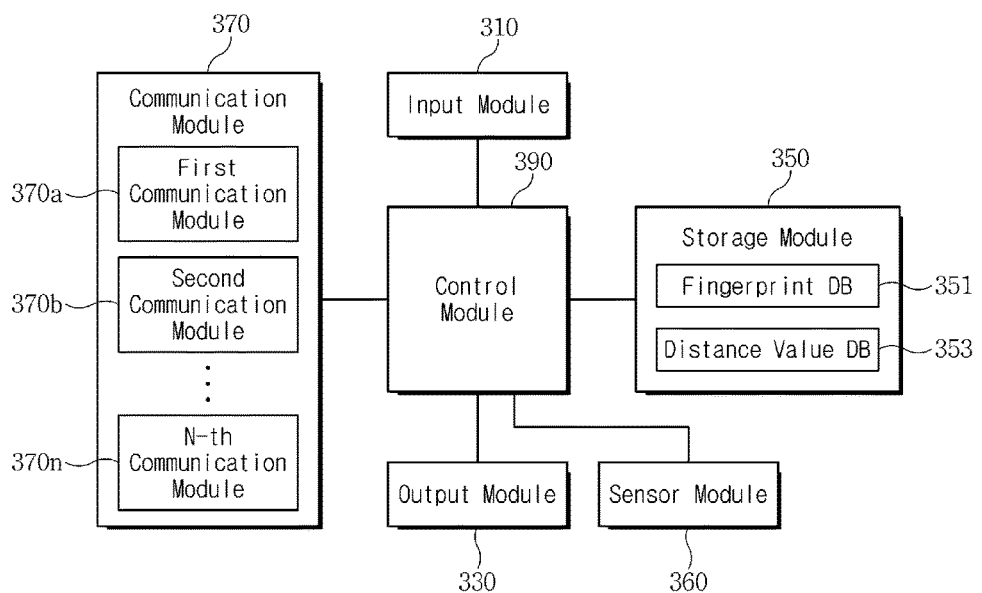

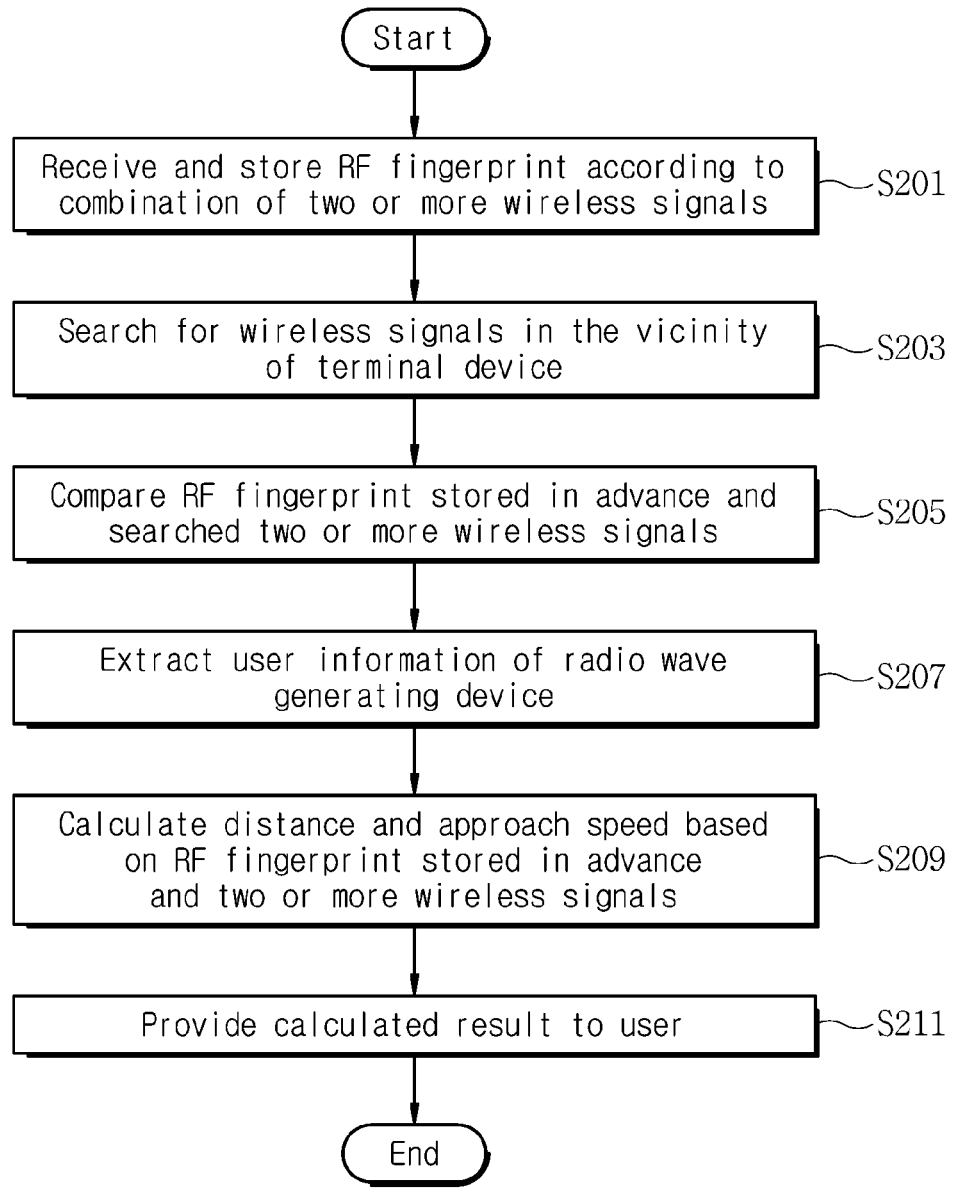

APPROACHING USER DETECTION, USER AUTHENTICATION AND LOCATION REGISTRATION METHOD AND APPARATUS BASED ON RF FINGERPRINT

CROSS-REFERENCE TO RELATED APPLICATION

This application claims priority to and the benefit of Korean Patent Application No. 10-2015-0179803 filed in the Korean Intellectual Property Office on Dec. 16, 2015, 10-2015-0188299 and 10-2015-0188305 filed in the Korean Intellectual Property Office on Dec. 29, 2015 respectively, the entire contents of which are incorporated herein by reference.

TECHNICAL FIELD

The present invention relates to an RF (radio frequency) fingerprint-based user authentication method, an approaching user detection method, a location registration method, and an apparatus for the same, and more particularly, to a method and apparatus according to a first embodiment of the present invention for calculating the extent of approach to a terminal device of a user who possesses a radio wave generating device, to a method according to a second embodiment of the present invention for increasing security and reliability of user authentication by performing a primary user authentication using RF fingerprint information and then performing a secondary user authentication by making a prediction about a fingerprint characteristic that changes according to the above-described behavior, and to a method according to a third embodiment of the present invention for registering a location of a wireless communications device for each store by collecting the surrounding wireless environment information when a user is making a payment via an electronic means included in a terminal device in a specific store, extracting location related information included in the payment information, and generating RF fingerprint information through mapping of both pieces of information.

BACKGROUND

Information described in this section does not constitute the prior art, but simply provides background information on the present embodiment.

In a wireless technique, a network connection point is separated unlike in a wired technique, and thus a broadcasting communication is basically performed between a device and a wireless connection device. Thus, a hacker may make a variety of attacks such as DOS (disk operating system), phishing, man-in-the-middle attacks, etc., by utilizing information obtained by monitoring a traffic in which individual devices communicate with one another even without making a special effort. Of course, a network administrator may also monitor such a traffic situation as does the hacker and detect the occurrence of such attacks and threats, and thereby respond to the attacks and threats.

However, there is a problem in that clone AP data of a hacker who identically replicates device identification information such as applied AP' (access point) MAC (media access control) address, SSID (service set identification), BSSID (basic service set identification), etc. and data of the applied AP are transmitted and received mixed, and therefore in this case, it is very important to detect whether wireless attacks occur, distinguish which one is a data frame sent by the hacker, and identify the location of a device corresponding to the hacker by considering the intensity of the received signals.

Therefore, in a fingerprinting technique, it is important to extract characteristics by which a specific device can be uniquely identified and classified, that is, a fingerprint through an analysis of information (e.g., physical hardware layer information such as in a wireless modem, MAC software layer information such as in a beacon header, etc.) received from a specific radio device, and there are a variety of techniques depending on the method of extracting these characteristics.

A fingerprinting mechanism is largely divided into fingerprint generating and classifying steps, and the fingerprint generating step is a step of collecting and processing a wireless signal transmitted by a device and extracting features by which a device can be uniquely identified, and the fingerprint classifying step is a step of classifying the feature values extracted in the generating step in a statistical manner and determining whether the classified feature values match with a fingerprint of the corresponding device extracted and stored during a learning process, thereby determining whether the corresponding device is a clone device.

Based on the determination result, when it is a normal device rather than a clone device, the corresponding device is recognized as a device of an authorized user, but in the prior art, when feature values of a wireless environment extracted in the generating step and the fingerprint of the device coincided with each other in a primary comparison, the corresponding device was recognized as a normal device based on the comparison result.

However, this approach has had a problem in that a clone device having the same fingerprint as that of a normal device may be manufactured by replicating the feature values of the wireless environment extracted in the generating step so that the clone device may again be recognized as a normal device. Therefore, on the one hand, a user authentication method with a high level of security is needed, and, on the other hand, a method is needed that can be utilized in fields other than simple user authentication using a high level of security and characteristics of an RF fingerprint.

Meanwhile, with the development of the mobile communications network and terminal specifications, mobile communication terminals have become essential belongings of modern people that penetrate boundaries of conventional simple communications devices or information providing devices and are showing a trend of evolving into total entertainment devices.

In addition, nowadays, use of a smart phone in which functions of a communications terminal and a PDA (personal digital assistant) are combined is popular. In such a smart phone, due to being an intelligent terminal to which computer support functions such as Internet communication, information search, etc. are added, a larger-capacity memory and a higher-performance CPU (central processing unit) are mounted compared to an existing communications terminal, and an OS (operating system) for supporting the execution of a variety of applications, voice/data communication, PC (personal computer) linkage, and the like is mounted.

As one of the application technologies using such a smart phone, a variety of location-based services (e.g., vehicle navigation device, map, path finding, indoor store guidance, etc.) that provide convenience to users have been introduced and received a lot of attention.

In general, the location-based services used outdoors uses a location tracking technique employing a GPS (global positioning system), and the location-based services used indoors mainly uses a network-based positioning technique such as RFID, Bluetooth, Wi-Fi, etc.

As such indoor positioning techniques, there are techniques including Cell-ID, triangulation, fingerprint, and the like.

The Cell-ID technique estimates a current location based on an AP (access point) which is closest to a location measurement object in the vicinity. While this technique is simple to implement, positioning accuracy is not high. Also while the triangulation technique basically provides a high location resolution, a problem is that location error may be increased by a phenomenon such as multipath fading. Further, since a special device capable of accurately obtaining this information is required, construction cost is increased. Thus, the fingerprint technique is preferred over the above-mentioned two techniques. The fingerprint technique arbitrarily selects a plurality of locations in a service area in advance and estimates a location using RSS (received signal strength) collected at the selected location.

In addition, in recent years, as the spread of a wireless communications network using Wi-Fi expands, millions of APs are installed everywhere in a city, and signal transmissions from beacon devices are also increasing due to provisions of a variety of beacon services. As a result, most stores may receive wireless signals of the AP or the beacon devices, and with an increase in the density of the installed APs, a mobile communications terminal device located indoors may estimate the location. On the other hand, in the case of a provider of such an AP or a beacon device, the provider may be aware of information on which store has a device installed by the provider itself, and based on this, may easily provide location-based services or service contents for the corresponding store. However, in the case of a wireless communications devices installed by other providers, since information about a store in which these wireless communications device are installed cannot be obtained, for the corresponding store, there are difficulties in providing location-based services via indoor location measurement or suitable service contents.

SUMMARY

The present invention is directed to providing a method and apparatus for detecting an approaching user according to a first embodiment of the present invention, in which a terminal device may search for two or more wireless signals transmitted by one or more radio wave generating devices, compare the searched wireless signal and an RF (radio frequency) fingerprint stored in advance, extract information about a user who possesses the radio wave generating device based on the comparison result, and calculate the extent of approach between the terminal device and the radio wave generating device based on the searched wireless signal and the RF fingerprint stored in advance, and thus may be helpful in preventing a lost child, a missing elderly, a companion dog, etc.

The present invention is also directed to providing a user authentication method and apparatus with high security according to a second embodiment of the present invention in which a fingerprint of a terminal device, that is, wireless environment characteristic information and wireless environment characteristic information stored in advance may be compared to perform a primary user authentication, an authentication condition including a specific behavior to be performed by a user may be transmitted to the terminal device when the primary user authentication is completed, and the user may perform the specific behavior to predict the changed wireless environment characteristic information of the terminal device, and then the predicted wireless environment characteristic information may be compared with the changed wireless environment characteristic information of the terminal device for performing a secondary user authentication.

The present invention is also directed to providing a technology according to a third embodiment of the present invention in which a user may collect wireless environment information about a wireless communications device located in the vicinity of a specific store when the user makes a payment or behaves similarly in the specific store.

The present invention is also directed to providing a method that may confirm payment information generated during the payment to extract location related information through which the location can be deduced from the confirmed payment information and map the extracted location related information with the collected wireless environment information to generate RF fingerprint information.

The present invention is also directed to providing a technology which may transmit the RF fingerprint information generated by the device which the user possesses to a server device so that the server device may extract more accurate results based on a plurality of pieces of RF fingerprint information.

One aspect of the present invention provides an approaching user detection method including: searching for, by a terminal device, two or more wireless signals transmitted by one or more radio wave generating devices; comparing the searched two or more wireless signals and an RF (radio frequency) fingerprint stored in advance; extracting user information corresponding to the one or more radio wave generating devices located within a predetermined radius from the terminal device based on the comparison result; and calculating the extent of approach between the terminal device and the one or more radio wave generating devices corresponding to the extracted user information based on the wireless signals and the RF fingerprint.

Here, the calculating may include calculating a first distance value between the one or more radio wave generating devices and the terminal device based on the wireless signals and the RF fingerprint.

Also, the calculating may include calculating an approach speed of the one or more radio wave generating devices based on a second distance value that is a distance value between the radio wave generating device and the terminal device which is calculated before the first distance value is calculated, the first distance value, and a difference of time points when the first and second distance values are calculated.

Also, before the searching, the approaching user detection method may further include receiving the RF fingerprint according to a combination of the two or more wireless signals transmitted by the radio wave generating device from the one or more radio wave generating devices or a server device, and storing the received RF fingerprint.

Another aspect of the present invention provides a user authentication method including: receiving from the terminal device, by a server device, first wireless environment characteristic information that is wireless environment characteristic information corresponding to a location of a terminal device; performing a primary user authentication by comparing wireless environment characteristic information stored in advance and the first wireless environment characteristic information; transmitting an authentication condition including a specific behavior to be performed by a user to the terminal device for the purpose of a secondary user authentication, when the primary user authentication is completed; receiving from the terminal device second wireless environment characteristic information that is wireless environment characteristic information corresponding to the location of the terminal device which is changed according to the authentication condition; performing the secondary user authentication by comparing the received second wireless environment characteristic information and wireless environment characteristic information set based on the authentication condition; and permitting the secondary user authentication, when the second wireless environment characteristic information and the set wireless environment characteristic information coincide with each other.

Here, the user authentication method may further include randomly generating the authentication condition.

Also, the user authentication method may further include predicting a change in the wireless environment characteristic information stored in advance which occurs when the user performs the authentication condition, wherein the performing of the secondary user authentication includes comparing the second wireless environment characteristic information and wireless environment characteristic information which is predicted to be changed according to the performance of the authentication condition.

Also, the transmitting may include transmitting the authentication condition in at least one form of an SMS (short message service) message, an MMS (multi-media message service) message, an SNS (social network service) message, and a pop-up message.

Meanwhile, the approaching user detection method and the user authentication method may be provided by a computer-readable recording medium in which a program for executing the approaching user detection method and the user authentication method is recorded.

Still another aspect of the present invention provides a terminal device including: one or more communications modules that detect one or more wireless signals in the vicinity of the terminal device; a storage module that stores an RF fingerprint generated by one or more radio wave generating devices; and a control module that searches for two or more wireless signals transmitted by the one or more radio wave generating devices through the communications module, extracts user information corresponding to the one or more radio wave generating devices located within a predetermined radius from the terminal device based on a comparison result between the searched wireless signals and the RF fingerprint stored in advance, and calculates the extent of approach between the one or more radio wave generating devices corresponding to the extracted user information and the terminal device based on the wireless signals and the RF fingerprint.

Here, the control module may calculate a first distance value that is a distance between the one or more radio wave generating devices corresponding to the user information and the terminal device based on the wireless signals and the RF fingerprint.

Also, the storage module may further store the calculated distance value between the radio wave generating device and the terminal device, and the control module may calculate an approach speed of the one or more radio wave generating devices based on a second distance value that is a distance value between the radio wave generating device and the terminal device which is calculated before the first distance value is calculated, the first distance value, and a difference of time points when the first and second distance values are calculated.

Also, the communications module may transmit and receive data to and from a server device and the one or more radio wave generating devices, and when receiving the RF fingerprint according to a combination of the two or more wireless signals transmitted by the one or more radio wave generating devices through the communications module from the one or more radio wave generating devices or the server device, the control module may control the received RF fingerprint to be stored in the storage module.

Yet another aspect of the present invention provides a server device including: a communications module that transmits and receives data to and from a terminal device in conjunction with a communications network; a storage module that stores wireless environment characteristic information corresponding to each of one or more reference locations; and a control module that performs a primary user authentication by comparing first wireless environment characteristic information that is wireless environment characteristic information corresponding to a location of the terminal device, which is received from the terminal device through the communications module, and wireless environment characteristic information stored in advance, transmits an authentication condition including a specific behavior to be performed by a user to the terminal device when the primary user authentication is completed, and then performs a secondary user authentication by comparing second wireless environment characteristic information that is wireless environment characteristic information corresponding to the location of the terminal device, which is changed according to the authentication condition received from the terminal device, and wireless environment characteristic information set based on the authentication condition.

Here, the control module may randomly generate the authentication condition.

Also, the control module may predict a change in the wireless environment characteristic information stored in advance which occurs when the user performs the authentication condition and perform the secondary user authentication by comparing the predicted wireless environment characteristic information and the second wireless environment characteristic information.

Also, the control module may transmit the authentication condition in at least one form of an SMS message, an MMS message, an SNS message, and a pop-up message through the communications module.

Effects of the Invention

According to a first embodiment of the present invention, two or more wireless signals searched by a terminal device and an RF fingerprint stored in advance may be compared to extract user information corresponding to one or more radio wave generating devices located within a predetermined radius, and the extent of approach between the radio wave generating device which a user possesses and the terminal device may be calculated based on the wireless signal information and the RF fingerprint stored in advance, so that excellent effects to prevent the disappearance of a lost child, a missing elderly, a companion dog, etc., may be achieved by utilizing the RF fingerprint.

In particular, when the extent of approach is calculated, a distance, an approach speed, and the like between the radio wave generating device and the terminal device may be calculated, so that at what distance an object protected by a user of the terminal device is located and at what speed the object moves away from or approaches the terminal device may be determined, thereby effectively protecting the object to be protected.

According to a second embodiment of the present invention, a primary user authentication may be performed by comparing wireless environment characteristic information of a terminal device and wireless environment characteristic information stored in advance, an authentication condition including a specific behavior to be performed by a user may be transmitted to the terminal device when the primary user authentication is completed, and the secondary user authentication may be performed by comparing the wireless environment characteristic information set on the basis of the authentication condition and the wireless environment characteristic information of the terminal device which has been changed by performing the primary user authentication, thereby achieving higher effects in terms of the security and reliability compared to an existing fingerprint-based user authentication method.

According to a third embodiment, when a user makes payment or the similar behavior in a specific store, wireless environment information about wireless communications devices located in the vicinity of the specific store may be collected, payment information generated in the payment may be confirmed to extract location related information through which the location can be deduced from the confirmed payment information, and the extracted location related information may be mapped with the collected wireless environment information, thereby easily grasping a store in which the payment is made.

In addition, the RF fingerprint information generated by the device which the user possesses may be transmitted to a server device, so that the server device may perform more accurate location registration of the wireless communications device for each store based on a plurality of pieces of RF fingerprint information.

BRIEF DESCRIPTION OF DRAWINGS

FIG. 3 is a flowchart illustrating a method for operating a radio wave generating device according to a first embodiment of the present invention.

FIG. 4 is a block diagram illustrating a configuration of a terminal device according to an embodiment of the present invention.

FIGS. 5 to 8 are flowcharts illustrating a method for operating a terminal device according to various embodiments of the present invention.

DETAILED DESCRIPTION

Figure 1:
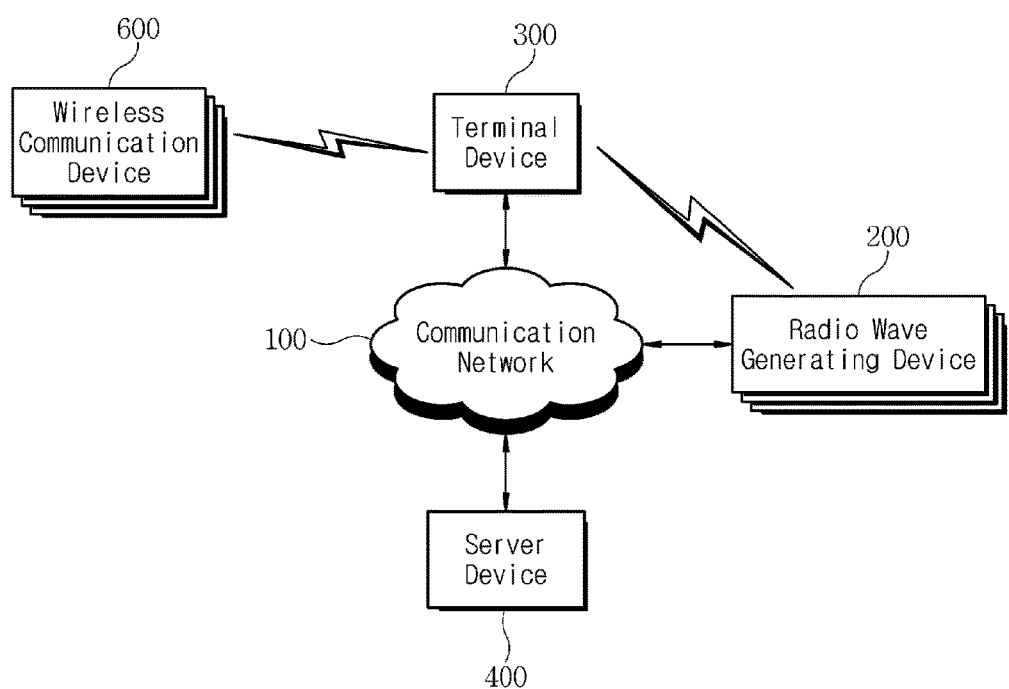
FIG. 1 is a diagram illustrating a configuration of a system for performing user authentication, an approaching user detection method, and a location registration method according to an embodiment of the present invention.

Hereinafter, exemplary embodiments of the present invention will be described in detail. However, the present invention is not limited to the exemplary embodiments disclosed below and can be implemented in various forms. The following exemplary embodiments are described in order to enable those of ordinary skill in the art to embody and practice the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used here, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, and do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

In addition to the above terms, certain terms in the description below are provided to aid the understanding of the present invention, and the use of such specific terms may be replaced with other terms within the scope and sprit of the invention.

In addition, embodiments within the scope of the present invention include a computer-readable medium which has or transmits computer-executable instructions or data structures stored in the computer readable medium.

Such a computer-readable medium may be an arbitrary available medium that is accessible by a general-purpose or special-purpose computer system.

For example, the computer-readable medium may include a RAM, a ROM, an EPROM, a CD-ROM, or other optical disk storage devices, magnetic disk storage devices, or magnetic storage devices and be used to store or transmit a predetermined program code means provided in the form of computer-executable instructions, computer-readable instructions, or data structures and include a physical storage medium such as arbitrary other media which are accessible by the general-purpose or special-purpose computer system but is not limited thereto.

In addition, the present invention may be carried out in a network computing environment having various types of computer system configurations including personal computers, laptop computers, hand-held devices, multiprocessor systems, microprocessor-based or programmable consumer electronics, network PCs, minicomputers, mainframe computers, mobile phones, PDAs, pagers, etc.

The present invention may be carried out in a distributed system environment in which all of local or remote computer systems which are linked in a wired data link, a wireless data link, or a combination of the wired and wireless data links perform tasks via a network. In the distributed system environment, program modules may be located in local and remote memory storage devices.

Meanwhile, wireless signals transmitted from a radio wave generating device and a wireless communications device according to the present invention may be diversified such as in Wi-Fi, Bluetooth, Zigbee, UWB (ultra-wideband), NFC (near field communication), RFID (radio frequency identification), etc., and any device may be utilized as the radio wave generating device and the wireless communications device according to the present invention as long as the device can generate wireless signals regardless of the type.

In addition, the radio wave generating device according to the present invention may generate one type of wireless signal or also generate two or more wireless signals.

Thus, a user who possesses the radio wave generating device may also possess two or more radio wave generating devices generating one type of wireless signal or also possess a single radio wave generating device generating two or more wireless signals.

Obviously, in some cases, the user may also possess two or more radio wave generating devices, each generating two or more wireless signals.

In the present invention, for convenience of description, a description will be made assuming that the user possesses a radio wave generating device generating two or more wireless signals.

As a radio wave generating device generating two or more wireless signals, a smart phone may be typically used. Thus, for convenience of description, description will be made assuming that the radio wave generating device is a smart phone.

However, the radio wave generating device is not limited to the smart phone, and any device may be used as the radio wave generating device as long as it can generate two or more wireless signals.

In addition, a terminal device that detects the extent of approach to the radio wave generating device may be a smart phone. Thus, the radio wave generating device and the terminal device are not necessarily a different type of device, and two or more devices having the same type may perform the function of each of the radio wave generating device and the terminal device, as necessary.

Meanwhile, according to embodiments of the present invention, wireless environment characteristic information corresponding to the location of the terminal device for performing a primary user authentication is referred to as first wireless environment characteristic information, and wireless environment characteristic information corresponding to the location of the terminal device which has been changed according to an authentication condition in order to perform a secondary user authentication is referred to as second wireless environment characteristic information.

The wireless environment characteristic information refers to unique wireless environment characteristic information when the terminal device is present in a specific location, that is, an RF fingerprint when the terminal device is present in the specific location.

Hereinafter, a device for implementing an embodiment of the present invention in a system according to an embodiment of the present invention will be described in detail with reference to the accompanying drawings.

FIG. 1 is a schematic diagram illustrating a structure of a system according to an embodiment of the present invention.

Referring to FIG. 1, an approaching user detection system according to an embodiment of the present invention may include a radio wave generating device 200, a terminal device 300, a server device 400, and a wireless communications device 600.

Here, the radio wave generating device 200 may transmit various types of wireless signals as described above, and thus a wireless signal searched by the terminal device 300 is not tied to a specific wireless signal.

Also the radio wave generating device 200 and the terminal device are linked with the server device 400 via a communications network 100.

Then, respective components will be schematically described with reference to FIG. 1.

First, the communications network 100 may serve to transmit data for data transmission and reception among the radio wave generating device 200, the terminal device 300, and the server device 400, use wired communications methods such as Ethernet, xDSL (ADSL, VDSL), HFC (hybrid fiber coaxial cable), FTTC (fiber to the curb), FTTH (fiber to the home), etc., and also use wireless communication methods such as WLAN (Wireless LAN), Wi-Fi, Wibro, Wimax, HSDPA (high speed downlink packet access), LTE (long term evolution), LTE-A (long term evolution advanced), etc. according to a system implementation method.

In addition, such a communications network 100 may include a large number of connection networks (not shown) and core networks (not shown) and may be configured to include an external network, for example, an Internet network (not shown). Here, the connection network (not shown) is a connection network that performs wired and wireless communications with the terminal device 300 and may be implemented as a plurality of base stations including BS (base station), BTS (base transceiver station), NodeB, eNodeB, etc. and a base station controller including BSC (base station controller), RNC (radio network controller), etc. In addition, as described above, a digital signal processing unit and a wireless signal processing unit which have been integrally implemented in the base station may each be classified into a digital unit (hereinafter, referred to as "DU") and a radio unit (hereinafter, referred to as "RU"), and a plurality of RUs (not shown) may be installed in a plurality of areas and connected to concentrated DU (not shown).

In addition, the core network (not shown) constituting the mobile network together with the connection network (not shown) serves to connect the connection network (not shown) and an external network, for example, an Internet network (not shown).

As described above, such a core network (not shown) may perform circuit switching or packet switching as a network system that performs a main function for mobile communications services such as controlling mobility or switching between the networks (not shown) and manage and control a packet flow within the mobile network. In addition, the core network (not shown) may manage mobility between frequencies and perform a linkage between the connection network (not shown) and traffic and other networks within the core network (not shown), for example, the Internet network (not shown). Such a core network may also further include SGW (serving gateway), PGW (PDN gateway), MSC (mobile switching center), HLR (home location register), MME (mobile mobility entity), HSS (home subscriber server), etc.

In addition, the Internet network (not shown) may refer to a typical opened communications network in which information is exchanged according to a TCP/IP protocol, that is, a public network, and it may be connected to the radio wave generating device 200 or the terminal device 300, provide information provided from the radio wave generating device 200 or the terminal device 300 to the server device 400 via the core network (not shown) and the connection network (not shown), or contrarily may provide the information provided to the server device 400 to the terminal device 300 via the core network (not shown) and the connection network (not shown). However, the present invention is not limited thereto, and the server device 400 may also be implemented integrally with the core network (not shown).

In addition, all types of communication methods other than the above-described communication which are well-known or will be developed in the future methods may be used.

The radio wave generating device 200 refers to a device that transmits mutually different types of wireless signals in a periodical or non-periodical manner.

Such a radio wave generating device 200 generates an RF fingerprint according to a combination of two or more wireless signals transmitted by the radio wave generating device 200 and one or more reference locations.

At this point, information included in the RF fingerprint may include identification information (for example, ID of the radio wave generating device, or the like) of the radio wave generating device 200, wireless signal transmission power, frequency channel information of the two or more wireless signals according to the combination, and the like, and in addition to these pieces of information, any information may be included in the RF fingerprint as long as a unique value capable of representing the radio wave generating device 200 can be generated by the combination of the wireless signals.

Having generated the RF fingerprint, the radio wave generating device 200 transmits the generated RF fingerprint to the server device 400 or the terminal device 300.

Then, the radio wave generating device 200 receives a user's request for selecting the combination of the two or more wireless signals and transmits the wireless signals according to the selected combination of the wireless signals.

For example, when a user selects a Bluetooth signal and an NFC (near field communication) signal, the radio wave generating device 200 transmits the Bluetooth signal and the NFC signal.

However, as to the input for the selection of the combination of the two or more wireless signals, while the radio wave generating device 200 may directly receive the user's request, the user's request may also be received from the terminal device 300 or the like.

In addition, the radio wave generating device 200 may transmit two or more wireless signals for the purpose of general data transmission and reception without separately receiving the user's request and thereby may also determine the extent of a user's approach.

That is, the radio wave generating device 200 may transmit and receive data to and from Bluetooth earphones while transmitting Bluetooth wireless signals for the purpose of connection with the Bluetooth earphones, and when the radio wave generating device 200 continuously transmits the NFC wireless signal for the purpose of payment for public transportation or the like, the terminal device 300 may detect the transmitted NFC wireless signal and thereby determine the extent of approach.

The terminal device 300 according to an embodiment of the present invention refers to a user's device capable of searching for and detecting the wireless signal transmitted from the radio wave generating device 200 according to a user's operation and transmitting and receiving a variety of data to and from the server device 400 via the communications network 100.

The terminal device 300 according to a first embodiment of the present invention receives the RF fingerprint according to the combination of the two or more wireless signals transmitted by one or more radio wave generating devices 200 from the radio wave generating device 200 or the server device 400 and stores the received RF fingerprint.

Next, the terminal device 300 searches for two or more wireless signals detected in the vicinity of the terminal device 300, compares the searched two or more wireless signals and the stored RF fingerprint, extracts one or more radio wave generating devices 200 located within a predetermined radius from the terminal device 300 based on the comparison result, and extracts user information corresponding to the extracted radio wave generating device 200.

That is, by comparing the searched two or more wireless signals and the stored RF fingerprint, identification information of the radio wave generating device 200 is obtained, and information about a user who possesses the radio wave generating device 200 is extracted through the identification information.

Also, the extent of approach between a possessor of the radio wave generating device 200 and a user of the terminal device 300 may be obtained by calculating the extent of approach between the radio wave generating device 200 and the terminal device 300 based on the wireless signals and the RF fingerprint, and at this point, the extent of approach may include a distance between the radio wave generating device 200 and the terminal device 300, a relative approach speed, etc.

Thus, the terminal device 300 may calculate the distance between the radio wave generating device 200 and the terminal device 300, that is, a first distance value based on the stored RF fingerprint and the searched two or more wireless signals, and store the calculated distance value.

At this point, for convenience of description, a stored distance value is referred to a second distance value.

That is, the second distance value refers to a distance value between the radio wave generating device 200 and the terminal device 300 which has been calculated before the first distance value is calculated.

Thus, the terminal device 300 may calculate a relative approach speed between the radio wave generating device 200 and the terminal device 300 based on the first distance value, the second distance value, and a time difference in which the first and second distance values are calculated.

For example, when the first distance value which is currently calculated is 5 m, the second distance value which has been previously calculated and stored by the terminal device 300 is 10 m, the first distance value is calculated at 14: 20: 30, and the second distance value is calculated in 14: 20: 25, a difference between the first distance value and the second distance value is 5 m and a difference between the time when the first and second distance values are calculated is 5 seconds, and therefore this means that a possessor possessing the one or more radio wave generating devices 200 is approaching the user of the terminal device 300 at a speed of 5 m/s.

Here, when the second distance value which has been previously calculated and stored is 5 m, the first distance value which is currently calculated is 10 m, the first distance value is calculated in 14: 20: 30, and the second distance value is calculated in 14: 20: 25, this means that the possessor possessing the one or more radio wave generating devices 200 is moving away from the user of the terminal device 300 at a speed of 5 m/s.

However, 5 m indicated by the first distance value and 10 m indicated by the second distance value are not information obtained considering direction, but rather information indicating that the radio wave generating device 200 is currently located at a radius of 5 m from the terminal device 300 and was located at a radius of 10 m in the past and therefore may not have accurately calculated the relative approach speed. Thus, in this case, when even the direction of the radio wave generating device relative to the terminal device 300 is determined at the time of calculating the first and second distance values by utilizing a radio wave generating device 200 or the terminal device 300 each having directivity, an accurate relative approach speed may be calculated.

The server device 400 that has calculated the extent of approach between the terminal device 300 and the radio wave generating device 200 provides the extent of approach between the possessor possessing the radio wave generating device 200 and the user of the terminal device 300 to the user of the terminal device 300 by revealing the calculated result.

Meanwhile, the above-described process of calculating the extent of approach between the radio wave generating device 200 and the terminal device 300 may be performed by the server device 400.

In this case, the terminal device 300 may search for two or more wireless signals in the vicinity of the terminal device 300, transmit the searched wireless signals to the server device 400, receive the extent of approach between the terminal device 300 and the radio wave generating device 200 which has been calculated by the server device 400, that is, a distance value between the terminal device 300 and the radio wave generating device 200 and a relative approach speed therebetween, and provide the received information to the user.

The terminal device 300 according to a second embodiment of the present invention may be preferentially connected to an app providing device (not shown) connected to a communications network 100, for example, an app store or the like, and receive and install an app for extracting feature values of wireless signals by receiving the wireless signals from the corresponding app store. The terminal device 300 may receive the wireless signals and extract wireless signal characteristic information by executing the installed app, transmit the extracted characteristic information to the server device 400, receive services (for example, user authentication and the like) mapped on the corresponding wireless signal characteristic information from the server device 400, and provide the received services to the user.

At this point, the terminal device 300 according to an embodiment of the present invention receives one or more wireless signals from one or more radio wave generating devices 200, extracts a first set of wireless environment characteristic information, that is, wireless environment characteristic information corresponding to a current location of the terminal device 300 from the received one or more wireless signals, and transmits the extracted first wireless environment characteristic information to the server device 400.

Next, the terminal device 300 receives a primary user authentication completion message notifying that the primary user authentication has been completed from the server device 400 and then receives an authentication condition message containing an authentication condition including a specific behavior to be shown by the user from the server device 400 for the purpose of a secondary user authentication.

At this point, the primary user authentication completion message and the authentication condition message may also be received simultaneously.

In addition, the authentication condition message may be received in at least one form of an SMS (short message service) message, an MMS (multi-media message service) message, an SNS (social network service) message, and a pop-up message.

The user of the terminal device 300 having received the authentication condition message examines the authentication condition message and executes an authentication condition corresponding to the authentication condition message.

When the location of the terminal device 300 is changed according to the user's execution of the authentication condition, the terminal device 300 extracts a second set of wireless environment characteristic information, that is, wireless environment characteristic information corresponding to the location of the terminal device 300, and transmits the extracted second set of wireless environment characteristic information to the server device 400.

At this point, when the user inputs a request for collecting the wireless environment characteristic information to the terminal device 300 after executing the authentication condition, the terminal device 300 may extract the second set of wireless environment characteristic information or automatically extract the second set of wireless environment characteristic information after a predetermined time has elapsed.

Next, when the terminal device 300 receives a secondary user authentication completion message, granting of the permission using the user authentication is completed.

The terminal device 300 according to a third embodiment of the present invention may store an application program for electronic payment and perform a payment event at a corresponding store. Here, a behavior represented as a payment event includes a behavior which is substituted for payment through the terminal device 300 including discount cards, membership point cards, coupons, and the like which are available in stores or a behavior which uses an application program having functions of all financial services which are available when accompanying with payment, including credit cards, check chards, membership cards, point cards, coupons, electronic cash, gift certificates, and the like.

Meanwhile, as described above, the terminal device 300 and the radio wave generating device 200 may be a terminal device that typically includes a smart phone that generates two or more wireless signals.

However, the terminal device including the terminal device 300 and the radio wave generating device 200 are not limited to the smart phone and may be implemented in various forms.

For example, as a terminal device 300 and a radio wave generating device 200 which are described in the present specification, a fixed terminal including a smart TV, a desktop computer, or the like as well as a mobile terminal including a smart phone, a tablet PC, a PDA (personal digital assistant), a PMP (portable multimedia player), an MP3 player, or the like may be used.

In addition, as the terminal device 300 and the radio wave generating device 200 according to the present invention, units having the same level as that of the above-described units may be used although they cannot be all listed due to significant modifications of portable devices according to the convergence trend of the digital devices, and any device may be used as the terminal device 300 and the radio wave generating device according to the present invention as long as it can download and install an app for calculating the extent of approach according to the present invention.

Such terminal device 300 and radio wave generating device 200 may be a user's devices capable of transmitting and receiving various types of data via the communications network 100 according to the user's operation. Such a terminal device may perform voice or data communication via the communications network 100, transmit and receive information to and from the server device 400 via the communications network 100, and receive information from a memory that stores a program and protocols for transmission and reception of a wireless signal-based call and processing thereof via a variety of communication methods. To this end, the terminal device including the radio wave generating device 200, the terminal device 300, and the like according to the present invention may include a microprocessor or the like for calculations and control by executing the wireless signal program.

Such terminal device 300 and radio wave generating device 200 may be preferentially connected to an app providing device (not shown) connected to the communications network 100, for example, an app store or the like, and receive and install an app for extracting feature values of wireless signals by receiving the wireless signals from the corresponding app store. The terminal device may detect the two or more wireless signals by executing the installed app, extract wireless signal characteristic information, that is, an RF fingerprint, transmit the extracted wireless signal characteristic information to the server device 400, receive services (for example, user authentication and the like) mapped on the corresponding characteristic information from the server device 400, and provide the received services to the user. The server device 400 according to a first embodiment of the present invention is a device that stores an RF fingerprint from a combination of two or more wireless signals sent by one or more radio wave generating devices 200 and provides the stored RF fingerprint to the terminal device 300.

In particular, the server device 400 according to the present invention receives and stores the RF fingerprint according to the combination of the two or more wireless signals from the one or more radio wave generating devices 200 and transmits the RF fingerprint in response to the transmission request to the terminal device 300 when an RF fingerprint transmission request from the terminal device 300 is received.

Meanwhile, in the process of calculating the extent of approach between the terminal device 300 and the one or more radio wave generating devices 200, the server device 400 other than the terminal device 300 may calculate and transmit the extent of approach. In this case, the server device 400 may provide the calculated extent of approach to the user of the terminal device 300 by transmitting the extent of approach to the terminal device 300.

That is, the server device 400 receives two or more pieces of wireless signal information searched by the terminal device 300 from the terminal device 300, compares the received wireless signal information and the RF fingerprint stored in advance, and extracts user information corresponding to the one or more radio wave generating devices.

At this point, the extracted user information may be user information corresponding to the radio wave generating device 200 located within a predetermined radius from the terminal device 300.

Next, the extent of approach between the terminal device 300 and the radio wave generating device 200 may be calculated based on the received wireless signal information and RF fingerprint, and at this point, the calculated extent of approach may be a distance between the terminal device 300 and the radio wave generating device 200 or also be a relative speed.

For calculating the relative speed, the distance between the terminal device 300 and the radio wave generating device 200 may be calculated and stored (a second distance value), and the distance between the terminal device 300 and the radio wave generating device 200 may be calculated once again after a predetermined time has elapsed (a first distance value), so that the relative speed may be calculated based on the first distance value, the second distance value, and a difference between time points when the first and second distance values are calculated.

The server device 400 provides numerical values for the calculated extent of approach to the user by transmitting the numerical values to the terminal device 300.

The server device 400 according to a second embodiment of the present invention may manage the wireless communications devices 600 and perform user authentication by receiving a user authentication request from the terminal device 300.

In particular, the server device 400 according to the present invention receives first wireless environment characteristic information, that is, wireless environment characteristic information corresponding to the location of the terminal device 300 from the terminal device 300, compares the wireless environment characteristic information stored in advance and the received first wireless environment characteristic information, and performs the primary user authentication.

That is, when the wireless environment characteristic information stored in advance and the received first wireless environment characteristic information coincide with each other, the primary user authentication is completed.

Here, the server device 400 stores in advance the wireless environment characteristic information which has been collected and extracted by the terminal device 300 in one or more reference locations, compares the stored wireless environment characteristic information and the received first wireless environment characteristic information when the first wireless environment characteristic information is received, and performs the primary user authentication.

When the primary user authentication is completed, the server device 400 transmits an authentication condition including a specific behavior to be performed by the user to the terminal device 300 for the purpose of the secondary user authentication after or while transmitting a primary user authentication completion message.

Here, the authentication condition may be transmitted to the terminal device 300 in at least one form of an SMS message, an MMS message, an SNS message, and a pop-up message.

At this point, as to the authentication condition, one or more authentication conditions may be set in advance and selectively transmitted to the terminal device 300 whenever the secondary user authentication is performed, but the server device 400 may randomly generate the authentication condition whenever the secondary user authentication is performed and transmit the randomly generated authentication condition to the terminal device 300.

Next, when the user performs the specific behavior according to the transmitted authentication condition, a change in the location of the terminal device 300 occurs according to the specific behavior, and the server device 400 receives wireless environment characteristic information corresponding to such a change in the location, that is, second wireless environment characteristic information from the terminal device 300, compares the received second wireless environment characteristic information and the wireless environment characteristic information set based on the authentication condition, performs the primary user authentication, and then performs a secondary user authentication when the set wireless environment characteristic information and the second wireless environment characteristic information coincide with each other.

At this point, in case, one or more authentication conditions transmitted to the terminal device 300 are set in advance and selectively transmitted, the wireless environment characteristic information changed based on the authentication condition may be also set in advance according to the authentication condition set in this manner, and in case the authentication condition is randomly generated, the change in the wireless environment characteristic information stored in advance which occurs when the user of the terminal device 300 performs the randomly generated authentication condition may be predicted using a simulation program included in a user authentication app, and the predicted wireless environment characteristic information and the second wireless environment characteristic information may also be compared to perform the secondary user authentication.

Obviously, although one or more authentication conditions are set in advance and selectively transmitted, the change in the wireless environment characteristic information stored in advance based on the transmitted authentication condition may be predicted using a simulation program, and the predicted wireless environment characteristic information and the second wireless environment characteristic information may also be compared to perform the secondary user authentication.

The server device 400 according to a third embodiment of the present invention may receive information collected by the terminal device 300 and register the location of the wireless communications device 600 for each store based on the received information.

The server device 400 according to an embodiment of the present invention has the same configuration as that of a typical web server or network server as a hardware. However, as software, the server device 400 includes a program module which is implemented through languages including C, C++, Java, Visual Basic, Visual C, and the like.

Meanwhile, a memory mounted in each device according to the present invention may store information within the corresponding device. According to one embodiment, the memory may be a computer-readable medium. According to one embodiment, the memory may be a volatile memory unit, and according to another embodiment, the memory may be a non-volatile memory unit. According to embodiment, the storage device is a computer-readable medium.

According to various different embodiments, the storage device may also include, for example, a hard disk device, an optical disk device, or some other mass storage devices.

Although example device configurations are described in the detailed description and in the figures, embodiments of the subject matter and the functional operations described in this specification can be implemented in a digital electronic circuit or in a computer software, firmware, or hardware that includes the structures disclosed in this specification and their structural equivalents or in combinations of one or more of them.

Embodiments of the subject matter described in this specification may be implemented as one or more computer program products, i.e., one or more modules of computer program instructions encoded on a computer-readable medium for execution or a control of the operation of a data processing apparatus. The computer-readable medium may be a machine-readable storage device, a machine-readable storage substrate, a memory device, a composition of materials affecting a machine-readable propagated signal, or a combination of one or more of them.

The wireless communications device 600 according to a second embodiment of the present invention refers to a device that transmits periodic or aperiodic wireless signals in order to transmit and receive a variety of data to and from the terminal device 300.

At this point, characteristics of the wireless signal which the terminal device 300 receives at a specific location including the frequency of the wireless signal transmitted by the wireless communications device 600, the strength of the wireless signal when the wireless signal reaches the terminal device 300, and the like is referred to as wireless signal characteristic information.

However, such wireless signal characteristic information may not only include the above-mentioned frequency or strength of the wireless signal and may include any characteristic as long as it is a unique value capable of indicating the terminal device 300 and the location of the terminal device 300.

The wireless communications device 600 according to a third embodiment of the present invention is located in a room in which radio fingerprint map-based services are provided and serves to transmit wireless signals to one or more mobile communication terminal devices. At this point, the wireless communications device 600 may broadcast the wireless signals including identification information (unique ID) to the mobile communication terminal device.

The wireless signals according to an embodiment of the present invention which are broadcast by the wireless communications device 600 may be signals which are periodically transmitted by a beacon device or signals designed to be transmitted and received by a radio AP device and each include device identification information as described above.

Such a wireless communications device 600 may be one of a router, a repeater, a switch, and a bridge, and can also be any device that can implement a short-range communication including WLAN (wireless LAN), UWB (ultra wideband), radio frequency, IrDA (infrared data association), Zigbee, Bluetooth, or the like.

A wireless environment is configured by the signals broadcast by the wireless communications device, and data generated by information that the terminal device measured or collected is referred to as wireless environment information.

That is, the wireless environment information is information indicating characteristics on all radio waves which can be detected in a specific location, and may include a MAC (media access control) address information, RSSI (received signal strength intensity/indication), and device identification information (SSID, BSSID, etc.) of the wireless communications device.

The MAC address corresponds to a kind of an address assigned to the wireless communications device 600 for the purpose of communication, and MAC is an abbreviation of media access control. The MAC address is present in all equipment used in the network such as a LAN card, a modem, a smart phone, etc. and is a unique number that is represented by a 12-digit hexadecimal number. The MAC address may be changed according to a change in the part as a unique one to each device and may be converted through MAC spoofing.

The MAC address consists of 48 bits total of which the first 24 bits include an identification code of OUI (organizational unique identifier) manufacturer and information of NIC manufacturer, and the remaining 24 bits include information of the LAN card.

Such a MAC address may be used in Ethernet, 802.11 wireless network, Bluetooth, IEEE 802.5 Token ring, IEEE 802 network, optical FDDI (fiber distributed data interface), ATM (switched virtual connection only), fiber channel, serial SCSI, ITU-T G.hn standard, and the like.

In communication methods such as FireWire, IPv6, Zigbee, 802.15.4, 6LoWPAN, etc., EUI-64 identifier rather than the MAC address may be used.

The signal strength information is obtained by measuring the strength of signals received from the wireless communications device 600, and the loss between the mobile communication terminal device and the wireless communications device 600 may be associated with a distance by which the signal has moved. Such signal strength information may be unstable depending on an environment of the mobile communication terminal device that performs the actual measurement.

More specifically, the signal strength information is greatly affected by antenna directivity of the wireless communications device 600, including walls, columns, furniture, people, etc., which are located between a transmission point and a reception point, materials consisting of interior structures, and the like.

The device identification information of the wireless communications device 600 may be SSID (service set identifier) which is a name that is displayed after obtaining it by searching for a radio device among devices for which communication by a Wi-Fi protocol is available, that is, a unique identifier that is added to each header of packets transmitted through WLAN and text data that are used when the radio devices are connected to BSS (basic service set). SSID distinguishes one wireless communications device 600 from another wireless communications device 600, and other devices trying to connect to a specific wireless communications device 600 may use a predetermined SSID. The terminal device 300 according to the present invention may also distinguish SSIDs and attempt a wireless connection.

When the wireless communications device 600 is a wireless AP device, device identification information of the wireless AP device may include an IP address.

When the wireless communications device 600 is a beacon device, device identification information of the beacon device may be a unique value of the BLE beacon including UUID (universally unique identifier), major/minor version, and signal strength in the case of the BLE beacon.

The device identification information of the BLE beacon generally consists of UUID of 16 bytes, major of 2 bytes, and minor of 2 bytes. UUID as an identifier standard used in software construction has been standardized as a part of DCE (distributed computing environment) by OSF (open software foundation) and is a unique identifier that is represented as 32 hexadecimal numbers.

In the case of a Wi-Fi beacon, device identification information of the Wi-Fi beacon may consist of BSSID, frequency, and signal strength and may be a unique value for each Wi-Fi. BSSID may refer to a 48-bit identifier of a network ID that identifies a basic service set in 802.11 which is a LAN (local area network) standard. Typically, BSSID may refer to a MAC address (media access control address or medium access control address) of an AP device, and BSSID may be generated as an arbitrary value in the case of an independent BSS or an ad hoc network.

A processor mounted in each device according to an embodiment of the present invention may process a program instruction for executing a method according to the present invention. According to one embodiment, the processor may be a single-threaded processor, and according to another embodiment, the processor may be a multithreaded processor. Further, the processor may process instructions stored in a memory or a storage device.

As above, the overall system according to an embodiment of the present invention has been schematically described.

Hereinafter, among the above-described components of the system, a configuration and operating method of the radio wave generating device 200 according to the present invention will be described.

Figure 2:
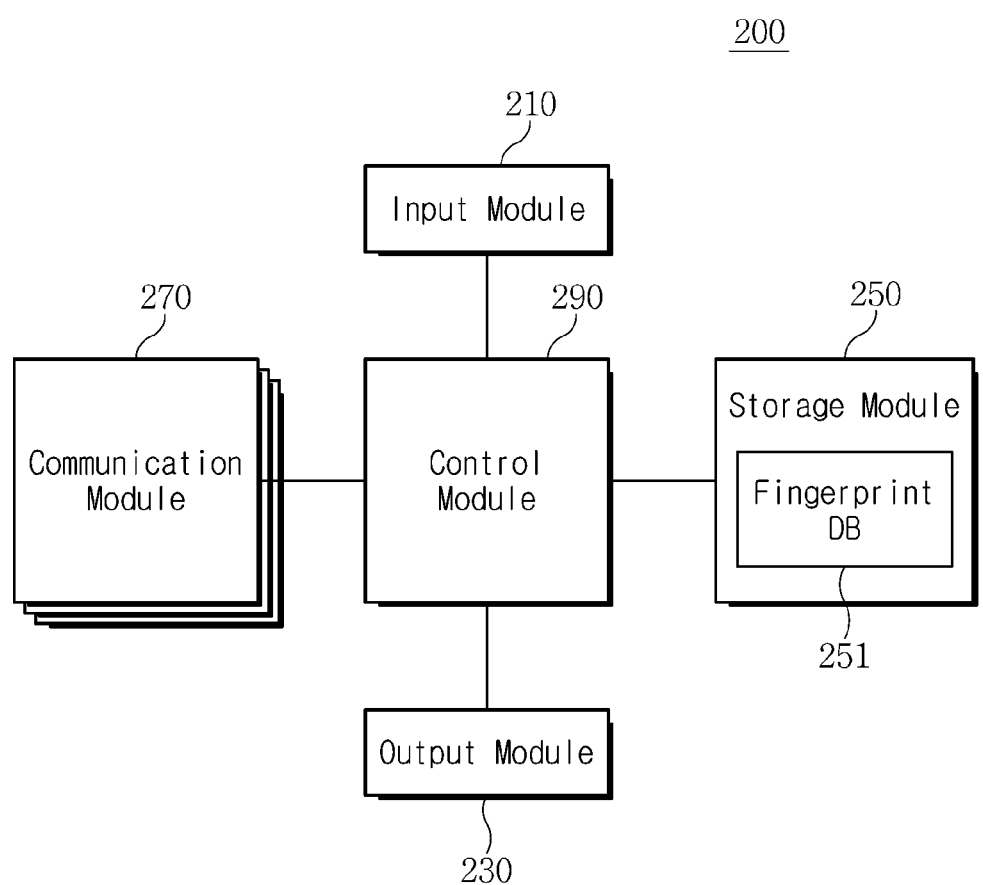
FIG. 2 is a block diagram illustrating a configuration of a radio wave generating device according to an embodiment of the present invention.

FIG. 2 is a block diagram illustrating a main configuration of the radio wave generating device 200 according to an embodiment of the present invention, and FIG. 3 is a flowchart illustrating a method for operating the radio wave generating device 200 according to an embodiment of the present invention.

First, referring to FIG. 2, the radio wave generating device 200 according to the present invention may include an input module 210, an output module 230, a storage module 250, one or more communications modules 270, and a control module 290.

The input module 210 receives various types of information such as numeral or character information and transmits to the control module 290 input signals associated with setting various functions and function control of the radio wave generating device 200. In addition, the input module 210 may include at least one of a keypad and a touch pad which generate input signals according to a user's touch or operation. At this point, the input module 210 may be configured in the form of a single touch pad (or touch screen) together with the output module 230 and simultaneously perform input and display functions. In addition, all types of input means which can be developed in the future may be used as the input module 210 in addition to input devices including a keyboard, a key pad, a mouse, a joystick, etc. In particular, the input module 210 according to the present invention may detect input information input from a user and transmit the detected input information to the control module 290.

In particular, in the present invention, the input module 210 receives information indicating which two or more signals among a plurality of wireless signals are to be transmitted from a user and transmits the received information to the control module 290.

The output module 230 displays information about a series of operating conditions and operating results that occur during performing the function of the radio wave generating device 200. In addition, the output module 230 may display menus of the radio wave generating device 200, user data input by a user, and the like. Here, the output module 230 may include an LCD (liquid crystal display), a TFT-LCD (thin film transistor LCD), an LED (light emitting diode), an OLED (organic LED), an AMOLED (active matrix OLED), a retina display, a flexible display, a three-dimensional (3D) display, and the like. At this point, when the output module 230 is configured in the form of a touch screen, the output module 230 may perform some or all of the functions of the input module 210.

The storage module 250 is a device for storing data, includes a main storage device and an auxiliary storage device, and stores application programs required for operating the functions of the radio wave generating device 200. Such a storage module 250 may roughly include a program area and a data area. Here, when activating each function of the radio wave generating device 200 in response to a user's request, the radio wave generating device 200 may execute the corresponding application programs under the control of the control module 290 to provide each function.

In particular, the storage module 250 according to the present invention may store RF fingerprint information, that is, a unique characteristic of the radio wave generating device 200 according to a combination of two or more wireless signals, in the form of a fingerprint DB 251.

The communications module 270 is for transmitting and receiving data to and from the server device 400 via the communications network 100 and receiving two or more wirelessly transmitted periodic or aperiodic wireless signals.

In addition, the communications module 270 includes an RF transmission means that up-converts and amplifies the frequency of the transmitted signal, an RF reception means that amplifies the received signal with low noise and down-converts frequency, a data processing means that processes a communication protocol according to a specific communication method, and the like. Such a communications module 270 may include at least one of a wireless communications module (not shown) and a wired communications module (not shown). The wireless communications module is a component for transmitting and receiving data according to a wireless communication method, and when the radio wave generating device 200 uses wireless communication, data may be transmitted and received to and from the server device 400 using any one of a wireless network communications module, a WLAN communications module, and a WPAN (wireless personal area network).

Here, the communications module 270 may include one or more communications modules 270 that generates one or more wireless signals and perform an embodiment of the present invention through any wireless communication methods even including Bluetooth, Wi-Fi, RFID, NFC, etc.

In addition, when the communications module 270 transmits and receives data to and from the server device 400 via the communications network 100, at least one of the plurality of communications modules 270 may use a wireless communication method including WLAN, Wi-Fi, Wibro, Wimax, HSDPA (high speed downlink packet access), or the like.

The control module 290 may be a process unit for driving an OS (operating system) and each component.

The control module 290 controls the overall operation process of the radio wave generating device 200, and the overall operation process of the radio wave generating device 200 which is controlled by the control module 290 will be described with reference to FIG. 3.

Referring to FIG. 3, the radio wave generating device 200 generates an RF fingerprint according to a combination of two or more wireless signals among a plurality of wireless signals, stores the generated RF fingerprint in the storage module 250 in operation S101, and transmits the stored RF fingerprint to the server device 400 or the terminal device 300 according to a user's request or as necessary in operation S103.

Next, the two or more wireless signals are selected from the plurality of wireless signals in response to the user's request in operation S105, and the wireless signals according to a combination of the selected wireless signals are transmitted in operation S109.

That is, when a user selects Bluetooth and NFC signals as the wireless signals to be transmitted, the radio wave generating device 200 transmits the Bluetooth and NFC signals.

The above-described overall operation process of the radio wave generating device 200 according to each of the embodiments of the present invention may be controlled and performed by the control module 290 of the radio wave generating device 200.

As above, the configuration and operating method of the radio wave generating device 200 have been described.

Hereinafter, configuration and operating method of the terminal device 300 according to the present invention will be described.

Referring to FIG. 4, the terminal device 300 according to the present invention may include one or more communications modules 370, a sensor module 360, a storage module 350, an output module 330, and a control module 390.

The communications module 370 is a device that performs the same function as the communications module 270 of the radio wave generating device 200, and serves to search for two or more wireless signals transmitted by the radio wave generating device 200.

Here, the communications module 370 may include one or more communications modules 370 that searches for and detects one or more wireless signals. At this point, the communications module 370 may detect and search for the one or more wireless signals in any wireless communication method such as Bluetooth, Wi-Fi, RFID, NFC, etc., and the number of the communications modules 370 should increase along with an increase in the number of kinds of the wireless communication methods.

In addition, when the communications module 370 transmits and receives data to and from the server device 400 via the communications network 100, at least one of a plurality of communications modules 370 may use wireless communication methods such as WLAN, Wi-Fi, Wibro, Wimax, HSDPA, etc.

In addition, at least one of a plurality of communications modules 370 of the terminal device 300 transmits and receives data to and from the server device 400 in conjunction with the communications network 100.

In particular, the communications module 370 according to a second embodiment of the present invention includes a first communications module 370a and a second communications module 370b.

The first communications module 370a receives signals transmitted from the wireless communications device 600. Here, as described above, the first communications module 370a may perform an embodiment of the present invention through any wireless communication method even including Bluetooth, Wi-Fi, RFID, NFC, etc.

The second communications module 370b communicates with the server device 400 via the communications network 100. Here, as described above, the second communications module 370b may use a wireless communication method such as WLAN, Wi-Fi, Wibro, Wimax, HSDPA, or the like.

The storage module 350 is a device that performs the same function as the storage module 250 of the radio wave generating device 200 and stores RF fingerprint information received from the radio wave generating device 200 or the server device 400 in the form of a fingerprint DB 351 and may store a distance value obtained by calculating a distance between the terminal device 300 and the radio wave generating device 200 based on the searched wireless signal information and the stored RF fingerprint in the form of a distance value DB 353.

Hereinafter, in the following description, a distance value stored in the distance value DB is referred to as a second distance value.

The sensor module 360 is a component that detects a user's movement and measures a movement distance and a movement direction and may include a GPS for determining a current location using a satellite, a geomagnetic sensor for determining an orientation of the four cardinal directions, a tilt sensor and an acceleration sensor for determining a user's movement speed or the number of user's steps, a gyro sensor, and the like.

In particular, the sensor module 360 according to the present invention may generate location information according to the operation of the GPS when a payment event occurs.

The output module 330 is a device that performs the same function as the output module 230 of the radio wave generating device 200 and displays to a user the extent of approach between the terminal device 300 and the radio wave generating device 200 which is calculated by the terminal device 300 or the server device 400.

Meanwhile, the terminal device 300 of FIG. 4 may also include an input module 310 of the terminal device 300 that performs the same function of the input module 210 of the radio wave generating device 200.

In this case, the input module 310 of the terminal device 300 receives a user's request for detecting the extent of approach with the radio wave generating device 200 and transmits the received user's request to the control module 390.

In addition, in order to provide various pieces of information to a user about the extent of approach, the input module 310 of the terminal device 300 may receive a request signal for the extent of approach desired by the user.

The control module 390 is a device that controls the overall operation process of the terminal device 300, and the overall operation process of the terminal device 300 controlled by the control module 390 according to first to third embodiments will be described with reference to FIGS. 5 to 8.

Referring to FIG. 5, according to a first embodiment of the present invention, the terminal device 300 receives and stores an RF fingerprint according to a combination of two or more wireless signals transmitted by the radio wave generating device 200 from one or more radio wave generating devices 200 or the server device 400 in operation S201 and searches for the two or more wireless signals in the vicinity of the terminal device 300 in operation S203.

Next, the terminal device 300 compares the searched two or more wireless signals and the RF fingerprint stored in advance in operation S205, extracts user information corresponding to the one or more radio wave generating devices 200 located within a predetermined radius from the terminal device 300 based on the comparison result, and determines who is the possessor of the radio wave generating device 200 that transmits the two or more radios signals in operation S207.

Then, the terminal device 300 calculates the extent of approach between the terminal device 300 and the radio wave generating device 200 corresponding to the extracted user information based on the RF fingerprint stored in advance and the searched wireless signals.

At this point, an indicator for the calculated extent of approach may include a distance and a relative approach speed between the terminal device 300 and the radio wave generating device 200, the terminal device 300 may calculate a distance value based on the searched wireless signals and the stored RF fingerprint, and calculate the relative approach speed between the terminal device 300 and the radio wave generating device 200 based on a first distance value, that is, the calculated distance value, a second distance value (previously calculated distance value) stored in a distance value DB 333, and a difference between the time points when the first and second distance values are calculated in operation S209.

Next, the terminal device 300 provides the calculated result to the user of the terminal device 300 through the output module 330 in operation S211.

Figure 6:
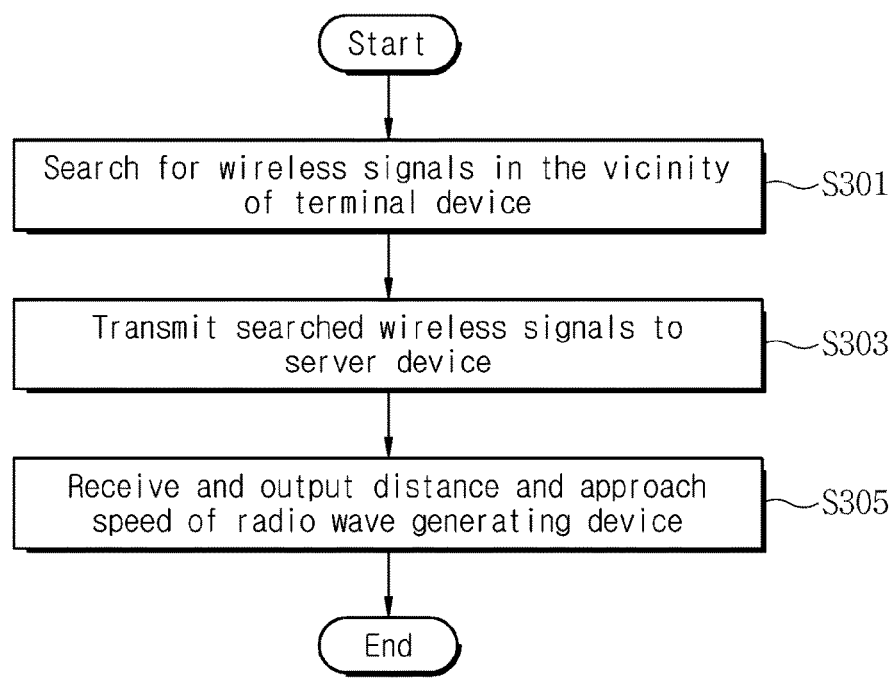

Meanwhile, a subject for calculating the extent of approach between the terminal device 300 and the radio wave generating device 200 may be the server device 400 rather than the terminal device 300, and in this case, examining the operation process of the terminal device 300 with reference to FIG. 6, the terminal device 300 searches for two or more wireless signals in the vicinity of the terminal device 300 in operation S301 and transmits the searched two or more wireless signals to the server device 400 in operation S303.

Next, when the server device 400 calculates the extent of approach between the terminal device 300 and the radio wave generating device 200, that is, calculates the distance and the relative approach speed between the terminal device 300 and the radio wave generating device 200, the terminal device 300 receives the calculated extent of approach and provides the received extent of approach to the user through the output module 330 in operation S305.

Figure 7:
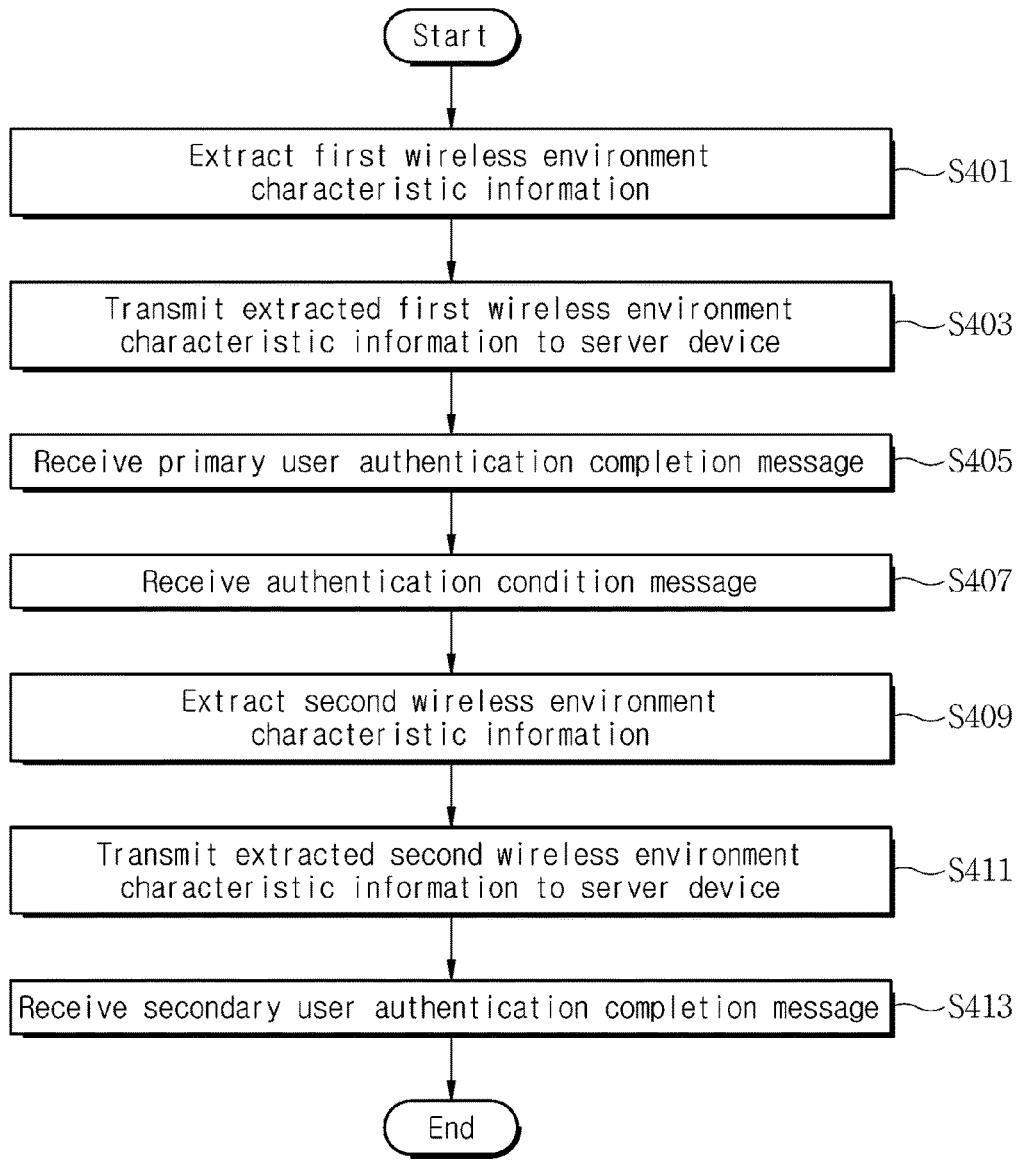

Now, referring to FIG. 7, according to a second embodiment of the present invention, the terminal device 300 receive wireless signals transmitted from one or more wireless communications devices 600 located in the vicinity of the terminal device 300, extracts first wireless environment characteristic information, that is, wireless environment characteristic information corresponding to the location of the terminal device 300 in operation S401, and transmits the extracted first wireless environment characteristic information to the server device 400 in operation S403.

Next, in operations S405 to 407, the terminal device 300 together or separately receives a primary user authentication completion message and an authentication condition message including a specific behavior to be performed by the user for the purpose of the secondary user authentication, and at this point, the authentication condition message may be received in at least one form an SMS message, an MMS message, an SNS message, and a pop-up message.

In operations S409 to S411, the user performs the specific behavior according to the authentication condition, extracts second wireless environment characteristic information, that is, wireless environment characteristic information corresponding to the changed position of the terminal device 300 from one or more wireless signals received from the one or more wireless communications devices 600, and then transmits the extracted second wireless environment characteristic information to the server device 400.

Next, in operation S413, the terminal device 300 finally completes user authentication by receiving a secondary user authentication completion message.

Figure 8:
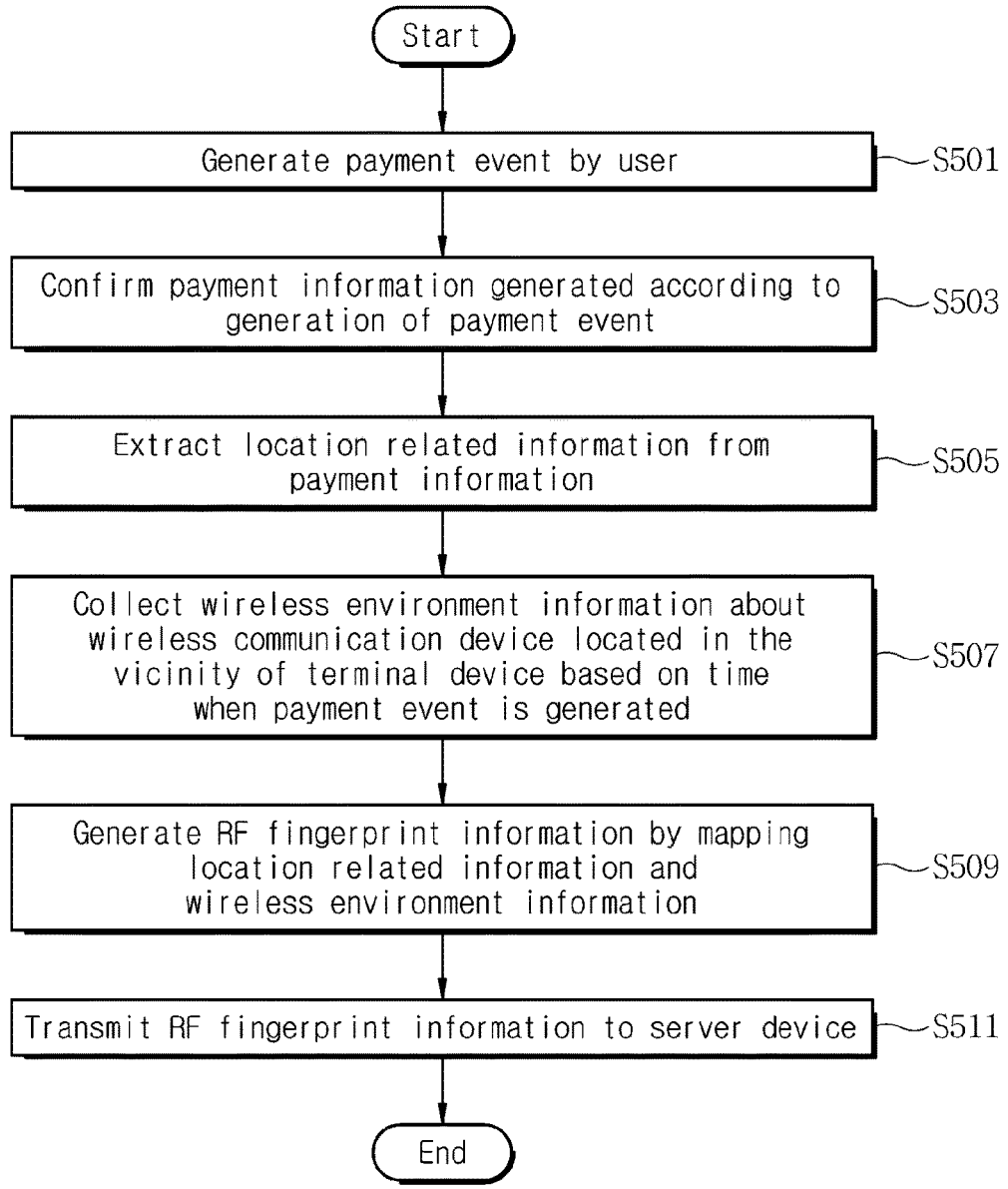

Meanwhile, referring to FIG. 8, according to a third embodiment of the present invention, a user of the terminal device 300 generates a payment event using an electronic payment application stored in the terminal device 300 in operation S501. The payment event here includes using or accumulating points for coupons as well as making purchases using electronic cards, etc. and includes all purchasing and accumulating actions which typically involve use of credit cards, check cards, membership cards, point cards, coupons, electronic money, gift certificates, etc.

Next, in operation S503, the terminal device 300 confirms payment information generated according to the generation of the payment event. In general, the payment information includes a name, address, phone number, and business registration number of a store at which a payment is made, a payment date and time, a paid-for item, a payment amount, etc.

In operation S505, the terminal device 300 may extract one or more pieces of information among the name, address, business registration number, and phone number which can be used to predict the location of the store from the payment information. As described above, this information is referred to as location related information.

In operation S507, the terminal device 300 collects wireless environment information about one or more wireless communications devices 600 located in the vicinity of the terminal device 300 when the payment event is generated regardless of the extraction time of the location related information. The wireless environment information may include one or more pieces of information among MAC address, RSSI, and device identification information containing SSID of the wireless communications device.

In addition, when other location measurement sensors such as GPS are operated at the time of the generation of the payment event, the terminal device 300 may generate location information.

In operation S509, when the location related information and the wireless environment information are extracted or collected, the terminal device 300 maps the two pieces of information. At this point, there may be a case in which a single piece of location related information and wireless environment information about two or more wireless communications devices 600 are collected, and in this case, according to the above-described first and second embodiments, the terminal device 300 extracts wireless environment information about the single wireless communications device 600 and map the extracted wireless environment information to the location related information.

Here, information generated through mapping is referred to as RF fingerprint information, and the terminal device 300 transmits the generated RF fingerprint information to the server device 400 in operation S511.

As described above, the overall operation process of the terminal device 300 according to the respective embodiments of the present invention may be controlled and performed by the control module 390 of the terminal device 300.

As above, the configuration and operating method of the terminal device 300 have been described.

Hereinafter, configuration and operating method of the server device 400 according to an embodiment of the present invention will be described.

Figure 9:
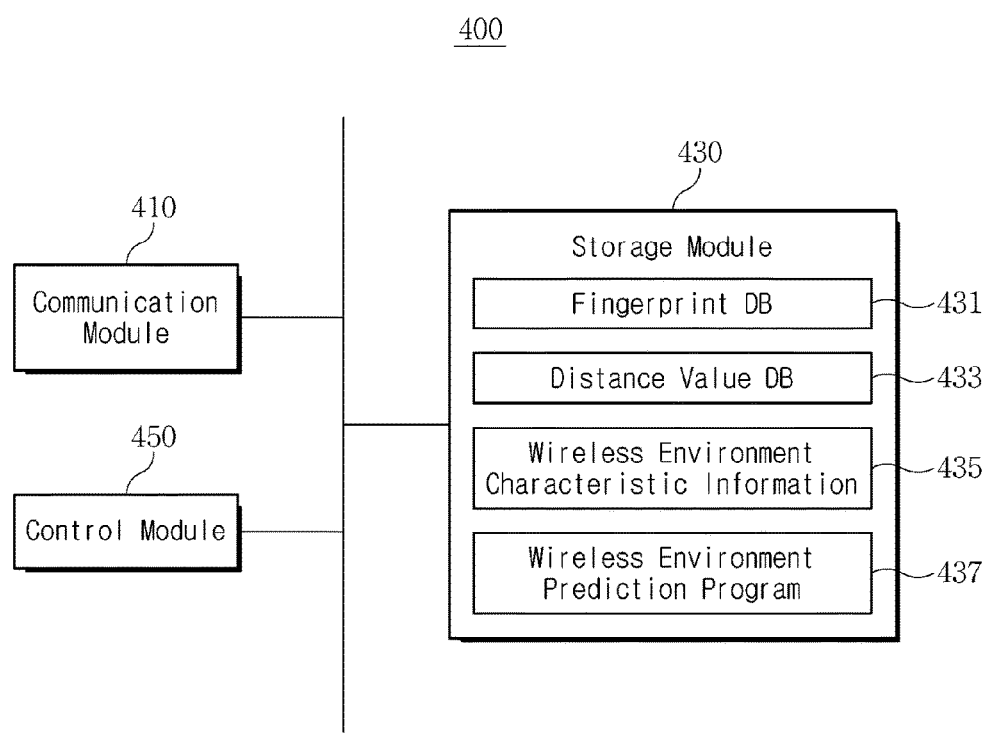
FIG. 9 is a block diagram illustrating a configuration of a server device according to an embodiment of the present invention.

Referring to FIG. 9, the server device 400 according to an embodiment of the present invention may include a communications module 410, a storage module 430, and a control module 450.

The communications module 410 may be used to communicate with the radio wave generating device 200 and the terminal device 300, and as a communications network for performing the function of the communications module 410, wireless communication methods such as WLAN, Wi-Fi, Wibro, Wimax, HSDPA, etc., may be used, but the present invention is not limited thereto. That is, wired communication methods including Ethernet, xDSL (ADSL, VDSL), HFC, FTTC, FTTH, etc. may be used according to a system implementation method.

In particular, the communications module 410 according to a first embodiment of the present invention may receive an RF fingerprint according to a combination of two or more wireless signals from the radio wave generating device 200 via the communications network 100 and transmit the received RF fingerprint and a result obtained by calculating the extent of approach between the terminal device 300 and the radio wave generating device 200 to the terminal device 300.

Meanwhile, the communications module 410 according to a second embodiment of the present invention may receive first and second wireless environment characteristic information from the terminal device 300 via the communications network 100 and transmit primary and secondary user authentication completion messages and an authentication condition message including a specific behavior to be performed by a user for the purpose of the secondary user authentication.

The storage module 430 is a device for storing data and includes a main storage device and an auxiliary storage device and stores application programs required for operating the functions of the server device 400. Such a storage module 430 may roughly include a program area and a data area. Here, when activating each function of the server device 400 in response to a user's request, the server device 400 executes the corresponding application programs under the control of the control module 450 to provide each function.

In particular, the storage module 430 according to the present invention may store an RF fingerprint according to a combination of two or more wireless signals received from the radio wave generating device 200 in the form of a fingerprint DB 431 and store a distance value between the radio wave generating device 200 and the terminal device 300 which has been calculated by the server device 400 in the form of a distance value DB 433.

The distance value stored in the distance value DB 433 is referred to as a second distance value.

In addition, the storage module 430 may receive and store wireless environment characteristic information 435 which has been collected and extracted by the terminal device 300 in one or more reference locations and store a wireless environment prediction program 437 for predicting a change in the stored wireless environment characteristic information when a user performs a specific behavior according to an authentication condition.

The stored wireless environment characteristic information 431 may be utilized in the primary user authentication, and the wireless environment characteristic information predicted by the wireless environment prediction program 437 may be utilized in the secondary user authentication.

Meanwhile, the storage module 430 may store a program for performing an RF fingerprint-based location registration method according to an embodiment of the present invention. The storage module 430 stores one or more pieces of RF fingerprint information collected from the terminal device.

In addition, the storage module 430 may be storing location information for each address and map which has been put into a DB in advance.

In particular, according to an embodiment of the present invention, the storage module 430 may register and store information on a map about the corresponding store and information about the wireless communications device 600 located in the corresponding store.

Alternatively, the storage module 430 may put the received RF fingerprint information into a DB in the form of text or table and store.

The control module 450 may control the overall operation of the server device 400.

Hereinafter, with reference to FIGS. 10 to 13, the function of the control module 450 that controls the overall operation process of the server device 400 will be described.

Figure 10:
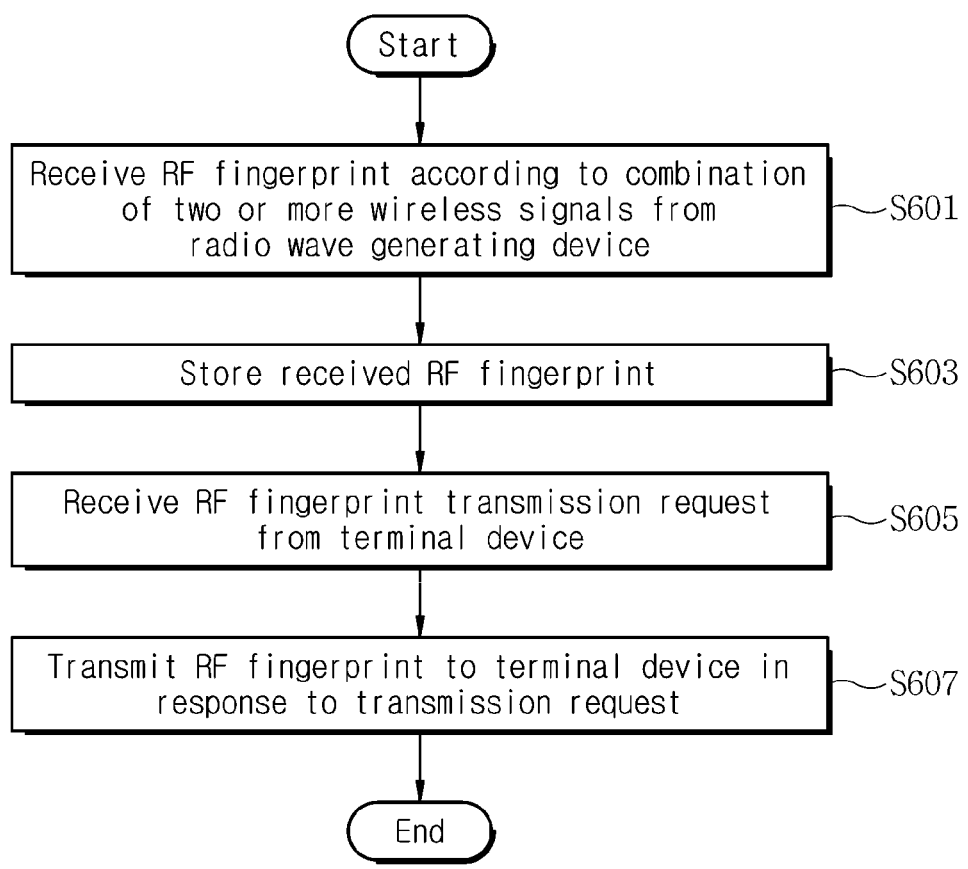
FIGS. 10 to 13 are flowcharts illustrating a method for operating a server device according to various embodiments of the present invention.
Figure 11:
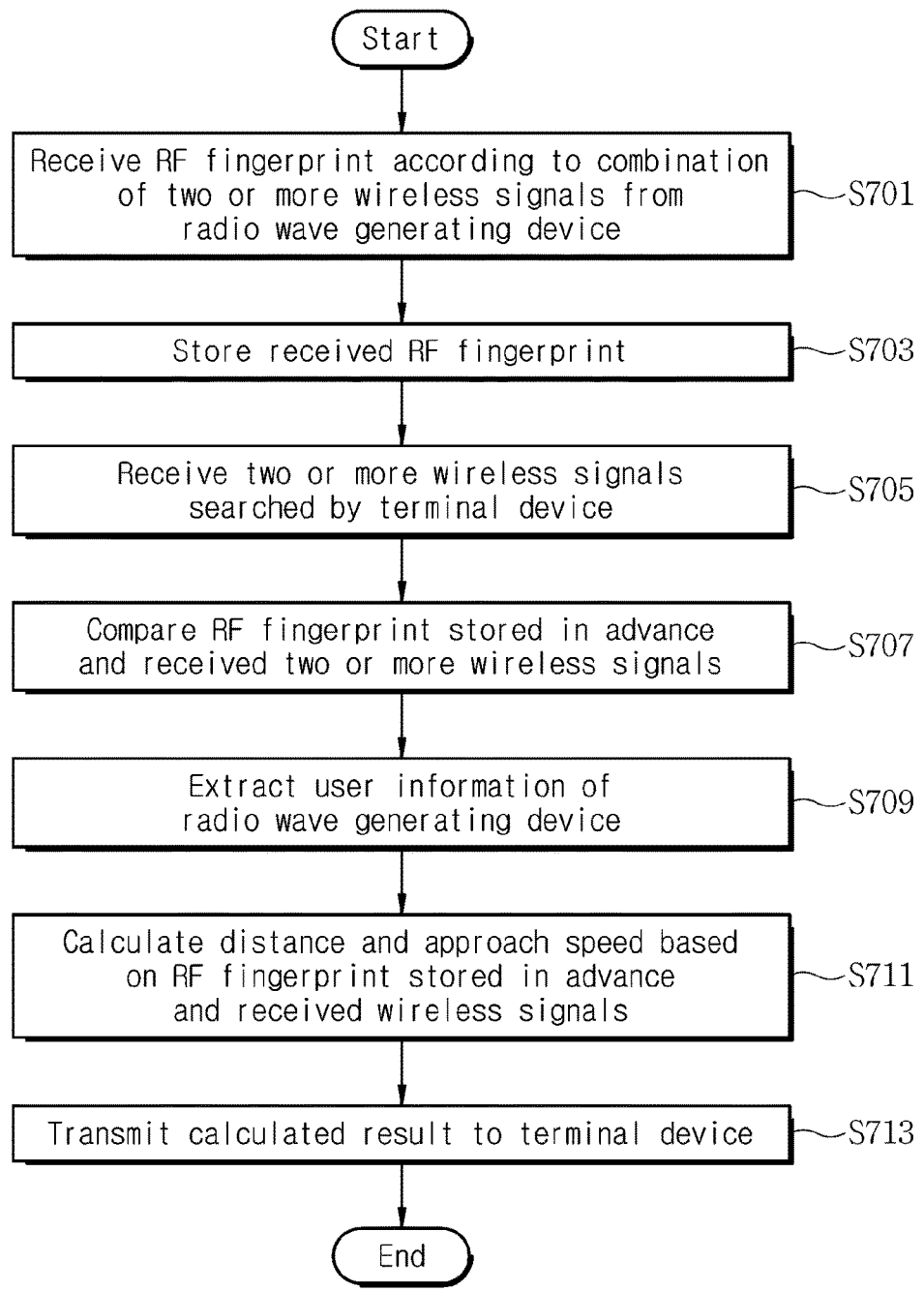

FIGS. 10 and 11 are used for describing a first embodiment of the present invention, and FIG. 10 is a flowchart illustrating an example in which the terminal device 300 calculates the extent of approach between the terminal device 300 and the radio wave generating device 200, and FIG. 11 is a flowchart illustrating an example in which the server device 400 calculates the extent of approach.

First, referring to FIG. 10, an operation process of the server device 400 in a case in which the terminal device 300 calculates the extent of approach will be described. In operations S601 to S603, the server device 400 receives and stores an RF fingerprint according to a combination of two or more wireless signals from one or more radio wave generating devices 200.

Next, when receiving an RF fingerprint transmission request from the terminal device 300 in operation S605, the server device 400 transmits the RF fingerprint to the terminal device 300 in response to the transmission request in operation S607.

Now, with reference to FIG. 11, an example in which the server device 400 calculates the extent of approach between the terminal device 300 and the radio wave generating device 200 will be described.

Referring to FIG. 11, the server device 400 receives an RF fingerprint according to a combination of two or more wireless signals from one or more radio wave generating devices 200 in operation S701 and store the received RF fingerprint in operation S703.

Next, when receiving the two or more wireless signals searched by the terminal device 300 from the terminal device 300 in operation S705, the server device 400 compares the RF fingerprint stored in advance and the received two or more wireless signals in operation S707 and extracts user information corresponding to one or more radio wave generating devices 200 located within a predetermined radius from the terminal device 300 based on the comparison result in operation S709.

That is, the server device 400 may extract information about a possessor who possesses the one or more radio wave generating devices 200 based on the comparison result.

Next, the server device 400 may calculate the extent of approach between the terminal device 300 and the one or more radio wave generating devices 200 corresponding to the extracted user information based on the received wireless signals and the RF fingerprint stored in advance in operation S711 and, at this point, the extent of approach may include a distance between the terminal device 300 and the radio wave generating device 200 and a relative approach speed at which the radio wave generating device 200 approaches or moves away from the terminal device 300.

At this point, the distance between the terminal device 300 and the radio wave generating device 200 is calculated based on the received wireless signal and the RF fingerprint stored in advance, and a distance value thus obtained is referred to as a first distance value.

In addition, as to the relative approach speed, an approach speed at which the one or more radio wave generating devices 200 approaches the terminal device 300 may be calculated based on the first distance value, a second distance value stored in the distance value DB 433, and a difference between time points when the first and second distance values are calculated.

Here, the first distance value refers to a distance value currently calculated by the server device 400 as described above, and the second distance value refers to a distance value which is previously calculated and stored in the distance value DB 433 by the server device 400.

In operation S713, the server device 400 transmits the result calculated in this manner to the terminal device 300.

Figure 12:
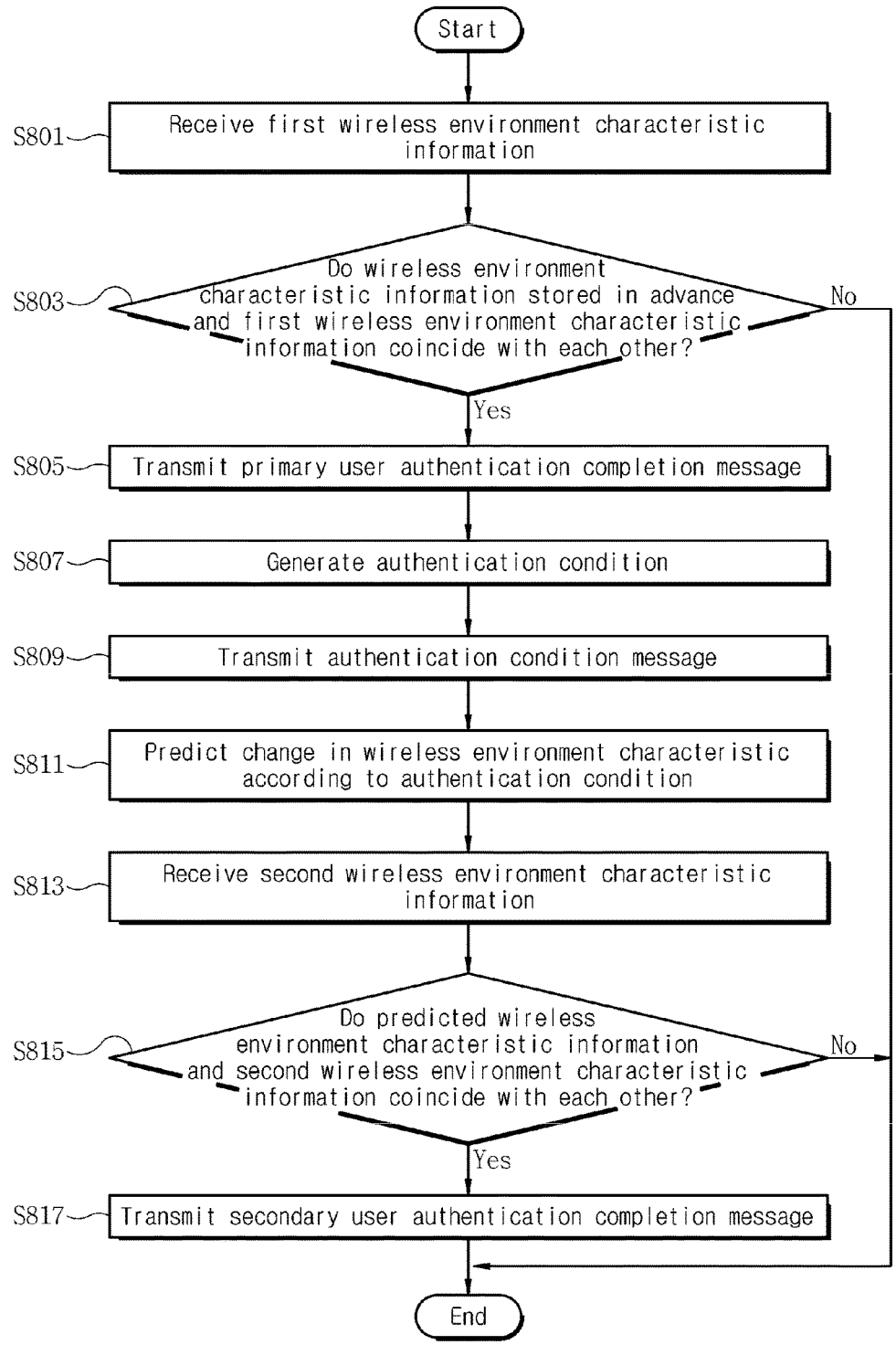

Now, referring to FIG. 12, according to a second embodiment of the present invention, the server device 400 receives first wireless environment characteristic information, that is, wireless environment characteristic information corresponding to the location of the terminal device 300 from the terminal device 300 in operation S801, determines whether the received first wireless environment characteristic information and the wireless environment characteristic information stored in the storage module 430 coincide with each other based on the comparison result therebetween, and performs a primary user authentication in operation S803.

When the first wireless environment characteristic information and the wireless environment characteristic information stored in advance do coincide with each other, the server device 400 transmits a primary user authentication completion message in operation S805.

In operation S807, the server device 400 may generate an authentication condition, and at this point, the authentication condition may be randomly generated or one or more authentication conditions may be set in advance to be stored in the storage module 430 and then at least one of the one or more authentication conditions generated in advance may be selected when the primary user authentication is completed.

Next, in operation S809, the server device 400 may transmit an authentication condition message including the generated authentication condition to the terminal device 300, and at this point, the authentication condition message may be transmitted in at least one form of an SMS message, an MMS message, an SNS message, and a pop-up message.

Next, in operation S811, the server device 400 predicts a change in the wireless environment characteristic information stored in advance which may occur when performing the authentication condition using the wireless environment prediction program 433 stored in the storage module 430.

When the one or more authentication conditions are set in advance to be stored rather than generating the authentication condition randomly, the change in the wireless environment characteristic information according to the set one or more authentication conditions may be mapped with the authentication condition and stored, and the secondary user authentication may also be performed using the stored information.

When receiving second wireless environment characteristic information, that is, wireless environment characteristic information corresponding to the location of the terminal device 300 which has been changed according to the authentication condition transmitted from the terminal device 300, the server device 400 compares the wireless environment characteristic information predicted by the wireless environment prediction program 433 and the second wireless environment characteristic information to perform the secondary user authentication in operation S815 and, when the predicted wireless environment characteristic information and the second wireless environment characteristic information coincide with each other, transmits a secondary user authentication completion message to the terminal device 300 to permit the secondary user authentication in operation S817.

Figure 13:
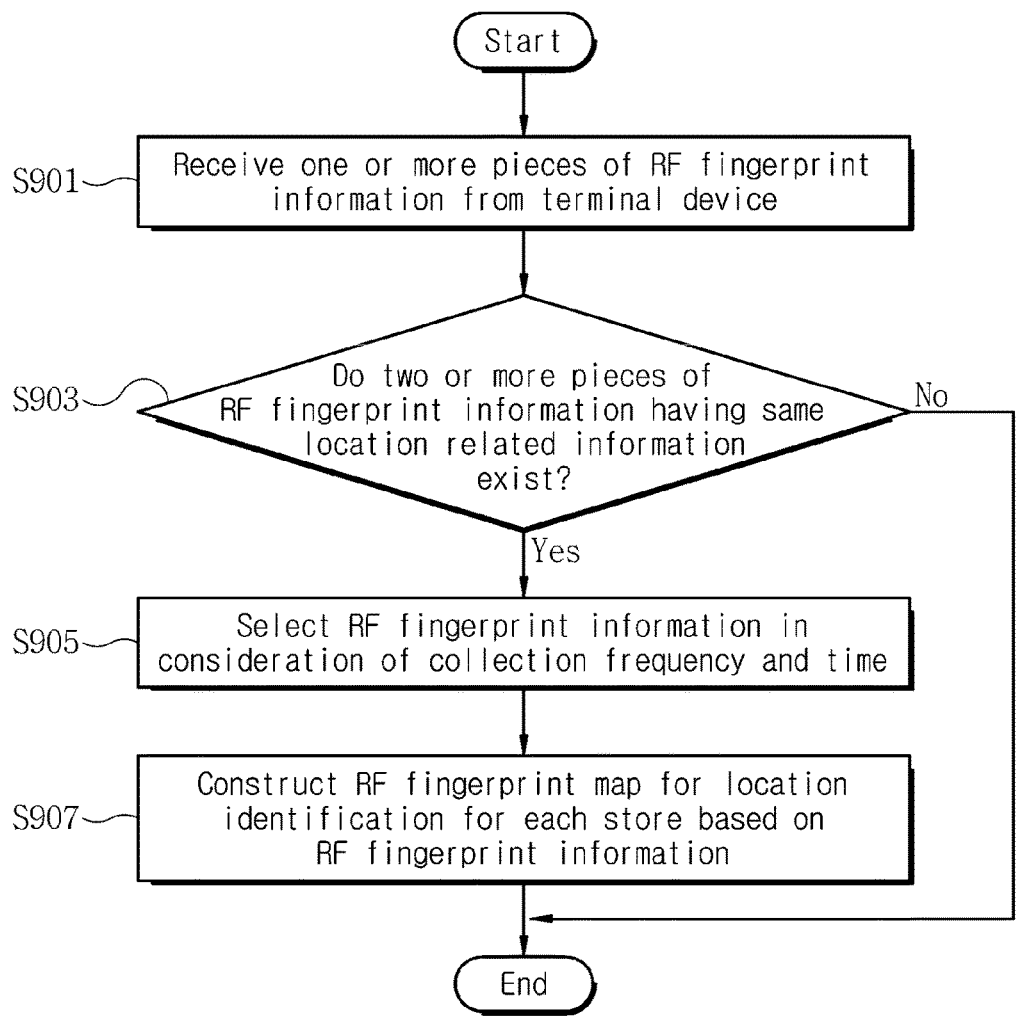

Meanwhile, referring to FIG. 13, according to a third embodiment of the present invention, the server device 400 receives one or more pieces of RF fingerprint information from the terminal device 300 in operation S901.

At this point, when two or more pieces of RF fingerprint information having the same location related information among a plurality of pieces of RF fingerprint information received from the terminal device 300 are present in operation S903, the server device 400 may select the RF fingerprint information corresponding to the corresponding store in consideration of a collection frequency and time of the RF fingerprint information in operation S905 and construct an RF fingerprint map for location identification for each store in operation S907.

When all the same wireless environment information is mapped onto the same location related information of the collected plurality of pieces of RF fingerprint information, the server device 400 constructs the RF fingerprint map for location identification for each store based on the corresponding wireless environment information and the location related information in operation S907.

In addition, as described above, the overall operation of the server device 400 may be controlled and performed by the control module 450 of the server device 400.

As above, the configuration and operating method of the server device 400 according to the present invention have been described.

Hereinafter, a variety of examples of a user authentication method according to a second embodiment of the present invention will be described.

Figure 14:
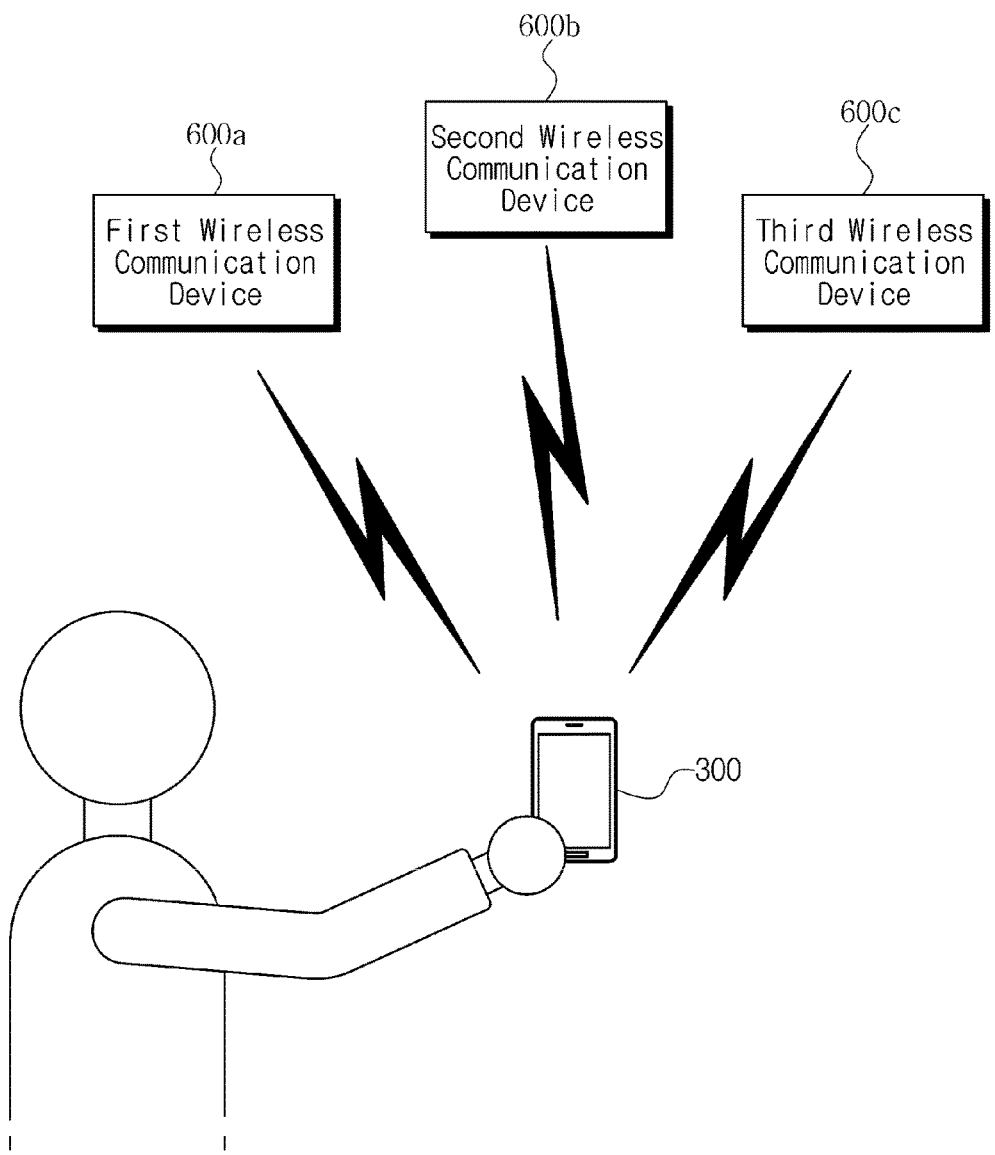
FIGS. 14 to 18 are diagram describing various embodiments of the present invention.
Figure 15:
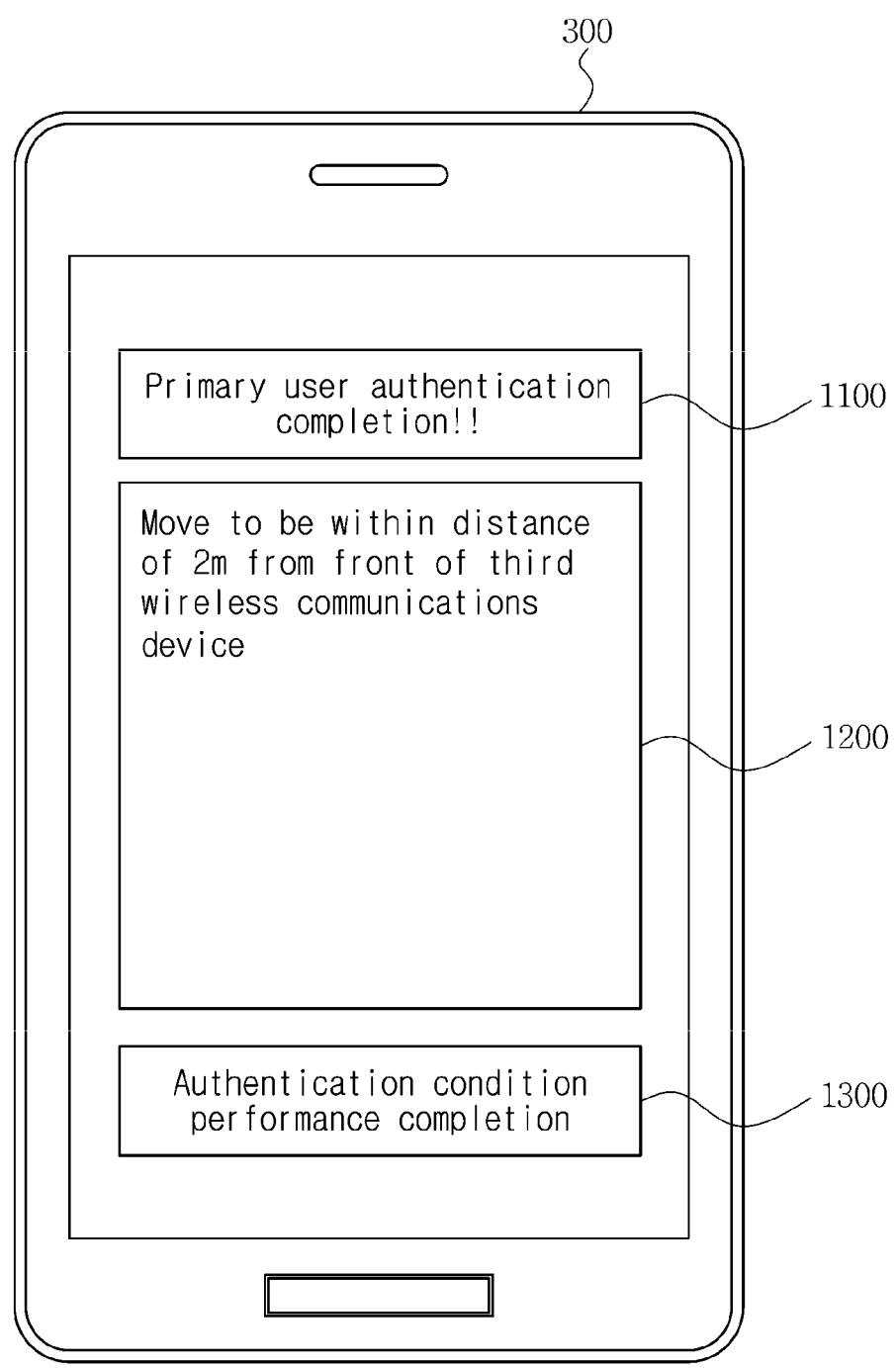
Figure 16:
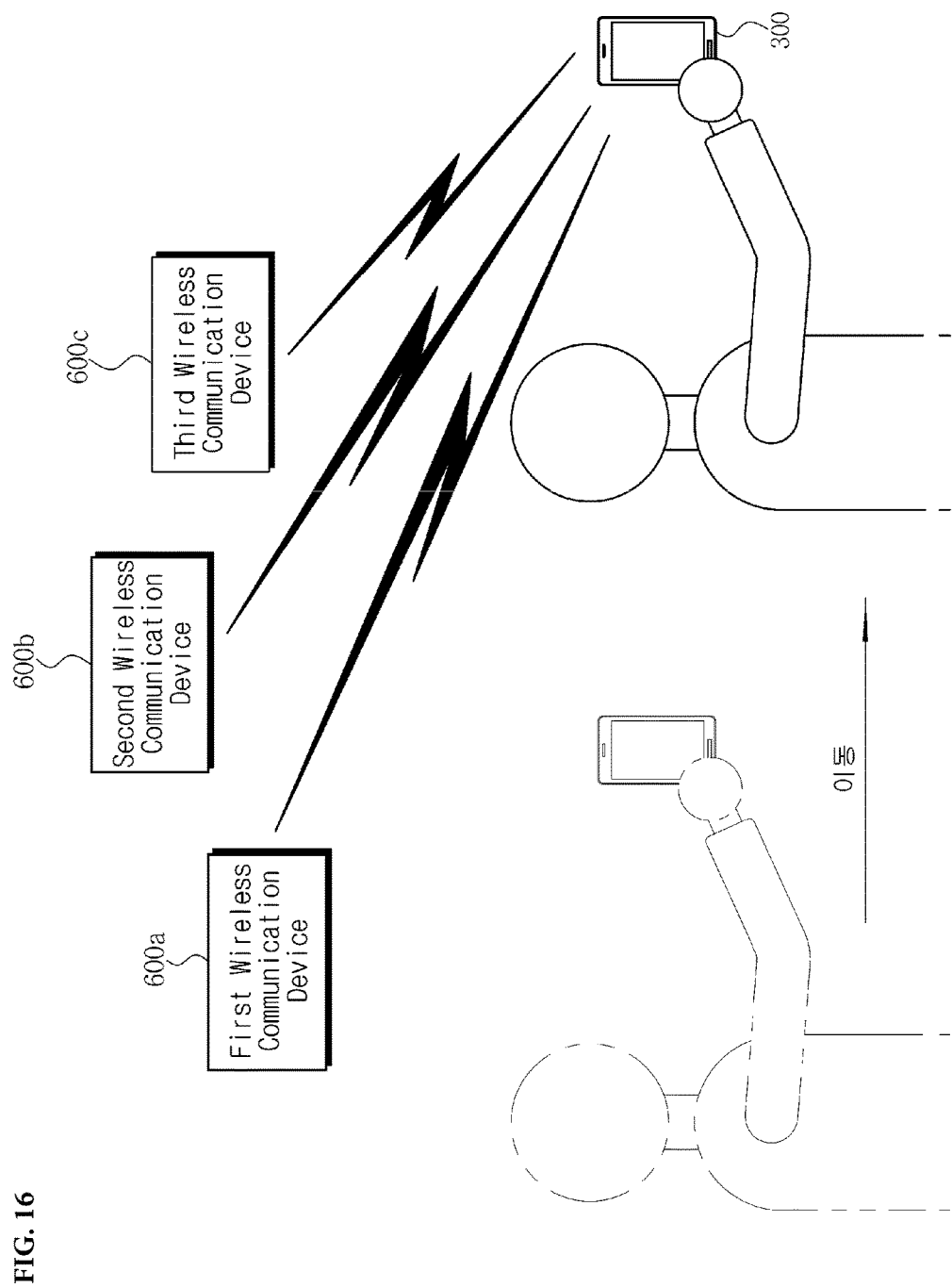
Figure 17:
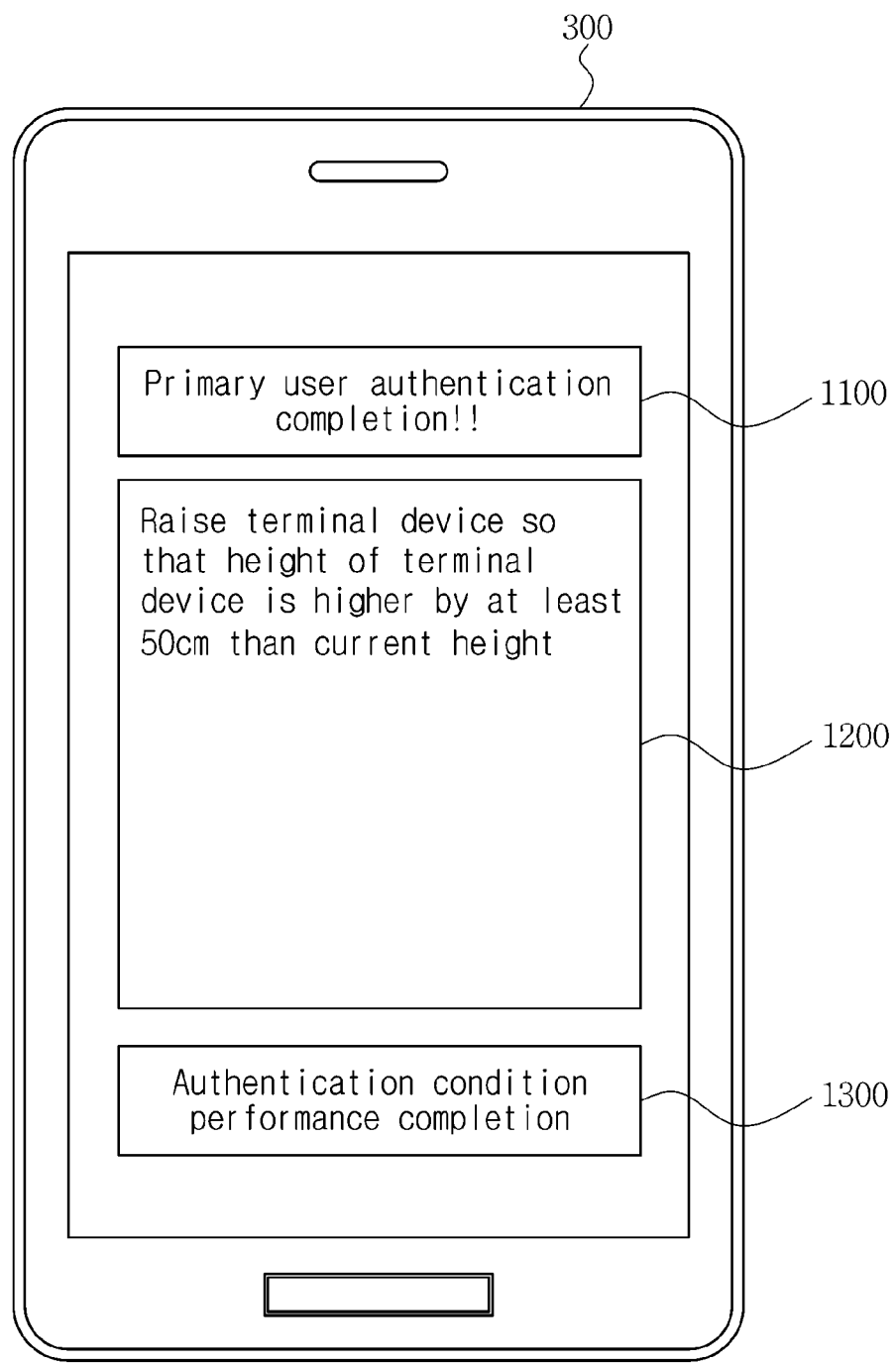
Figure 18:
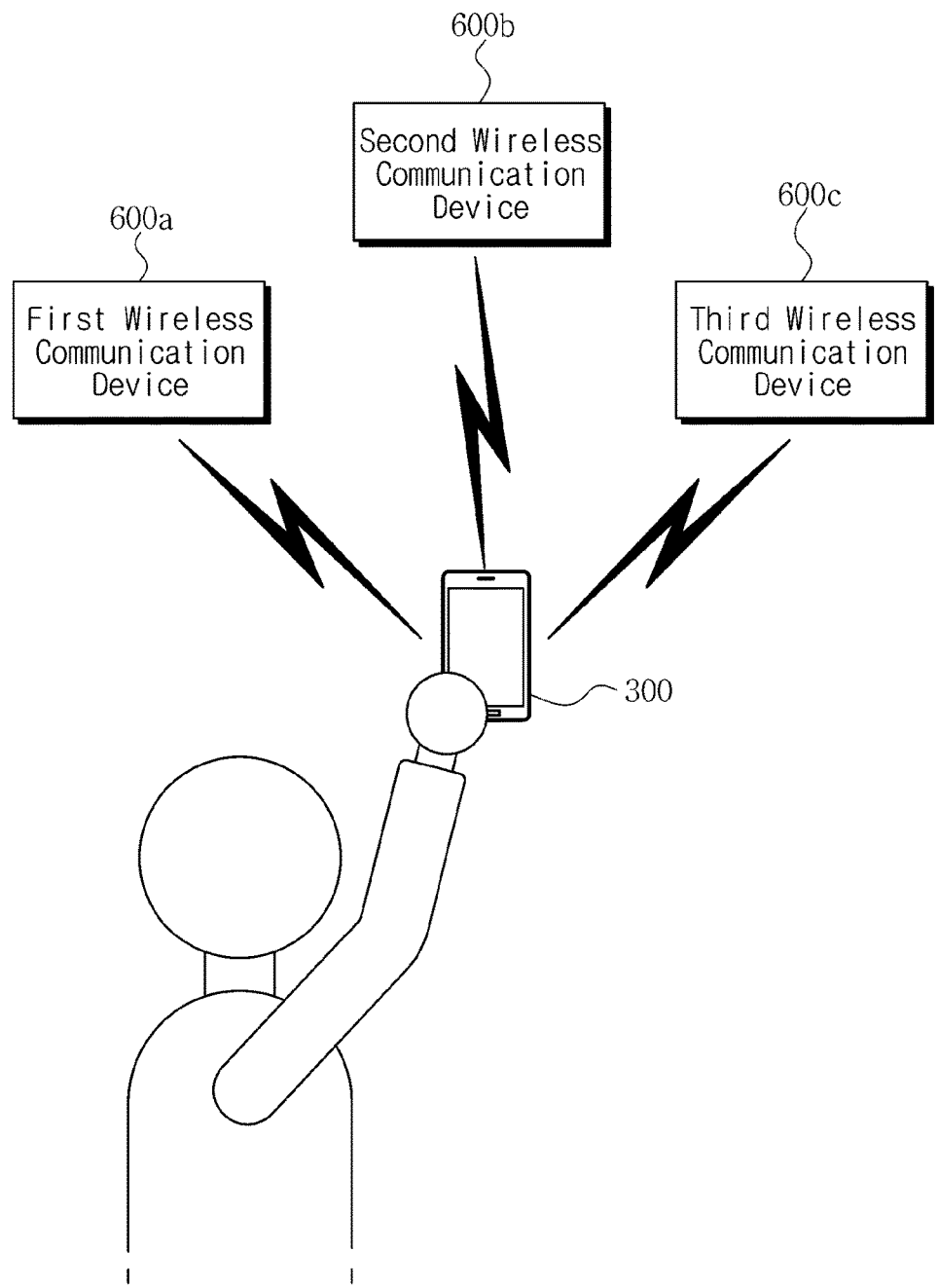

FIGS. 14 to 16 are views illustrating an example of the user authentication method according to the second embodiment of the present invention, and FIGS. 17 and 18 are views illustrating another example of the user authentication method according to the second embodiment of the present invention.

Referring to FIG. 14, a user who possesses the terminal device 300 receives wireless signals from first to third wireless communications devices 600*a* to 600*c*.

At this point, strength and frequency characteristics of the wireless signals of the first to third wireless communications devices 600*a* to 600*c* which are transmitted to the terminal device 300 from the first to third wireless communication devices 600*a* to 600*c* may be different depending on the location of the terminal device 300.

In this manner, the first wireless environment characteristic information, that is, wireless environment characteristic information of wireless signals transmitted from the first to third wireless signal generating devices 600*a* to 600*c* corresponding to a current location of the terminal device 300, that is, received by the terminal device 300 at its current location has a unique value, and the first wireless environment characteristic information having such a unique value may be extracted from the wireless signals which the terminal device 300 receives from the first to third wireless communications devices 600*a* to 600*c*.

When the terminal device 300 transmits the first wireless environment characteristic information extracted in this manner to the server device 400, the server device 400 compares the received first wireless environment characteristic information and the wireless environment characteristic information stored in advance in the server device 400 to perform the primary user authentication.

Next, when the first wireless environment characteristic information and the wireless environment characteristic information stored in advance coincide with each other based on the comparison result, the server device 400 completes the primary user authentication.

Next, the server device 400 transmitting a message for the secondary user authentication to the terminal device 300 will be described with reference to FIG. 15.

Referring to FIG. 15, when the primary user authentication is completed, the server device 400 transmits a primary user authentication completion message 1100 to the terminal device 300, and when receiving the primary user authentication completion message, the terminal device 300 provides the primary user authentication completion message 1100 to the user.

Next, the server device 400 transmits to the terminal device 300 an authentication condition message including a specific behavior 1200 to be performed by the user for the purpose of the secondary user authentication, and the terminal device 300 which receives the authentication condition message provides the specific behavior 1200 to be performed by the user for the purpose of the secondary user authentication to the user.

In the embodiment described in FIG. 15, the specific behavior 1200 to be performed by the user for the purpose of the secondary user authentication is "Move to be within a distance of 2 m from the front of the third wireless communications device".

Meanwhile, as shown in FIG. 15, the primary user authentication completion message 1100 and the specific behavior 1200 to be performed by the user for the purpose of the secondary user authentication may be transmitted to the terminal device 300 together and displayed on the terminal device 300 together.

In addition, the primary user authentication completion message and the authentication condition message may be transmitted in at least one form of an SMS message, an MMS message, an SNS message, and a pop-up message, and displayed on the terminal device 300.

As shown in FIG. 16, when the specific behavior 1200 to be performed by the user for the purpose of the secondary user authentication which has been transmitted from the server device 400 to the terminal device 300, that is, "Move to be within a distance of 2 m from the front of the third wireless communications device", that is, when a user moves to be within a distance of 2 m from the front of the third wireless communications device 600c while possessing the terminal device 300, the terminal device 300 receives wireless signals from the first to third wireless communications devices 600a to 600c, extracts second wireless environment characteristic information, that is, wireless environment characteristic information at the location of the terminal device 300 which has been changed depending on the authentication condition in a case in which the terminal device 300 is located within the distance of 2 m from the front of the third wireless communications device 600c, and transmits the extracted second wireless environment characteristic information to the server device 400.

At this point, when the user who possesses the terminal device 300 moves to be within the distance of 2 m from the front of the third wireless communications device 600c, the user may request extraction of second wireless environment characteristic information for the secondary user authentication from the terminal device 300 by pushing an authentication condition performance completion button 1300 of FIG. 15.

However, when a predetermined time elapses without the user pushing the authentication condition performance completion button 1300, the terminal device 300 may also automatically extract the second wireless environment characteristic information.

The server device 400 which has received the second wireless environment characteristic information extracted by the terminal device 300 compares wireless environment characteristic information set based on the authentication condition and the second wireless environment characteristic information to perform the secondary user authentication, and at this point, when the user performs the authentication condition according to the authentication condition transmitted to the terminal device 300 using the wireless environment prediction program, the server device 400 may predict the wireless environment characteristic information extracted from the terminal device 300 and compare the predicted wireless environment characteristic information and the second wireless environment characteristic information to perform the secondary user authentication.

When the two pieces of the wireless environment characteristic information coincide with each other based on the comparison result thereof, the server device 400 may complete the secondary user authentication and transmit a secondary user authentication completion message to the terminal device 300 to provide the secondary user authentication completion message to the user.

With reference to FIGS. 14, 17, and 18, another example for user authentication according to the present invention will be described.

As shown in FIG. 14, the terminal device 300 receives wireless signals from the first to third wireless signal generating devices 600a to 600c, extracts first wireless environment characteristic information, that is, wireless environment characteristic information corresponding to the current location of the terminal device, and compares the extracted first wireless environment characteristic information and wireless environment characteristic information stored in advance to perform the primary user authentication.

When the first wireless environment characteristic information and the wireless environment characteristic information stored in advance coincide with each other based on the result of primary user authentication, the server device 400 completes the primary user authentication and transmits to the terminal device 300 an authentication condition including the specific behavior 1200 to be performed by the user for the purpose of the secondary user authentication while transmitting the primary user authentication completion message 1100 as shown in FIG. 9.

In FIG. 17, the specific behavior 1200 to be performed by the user for the purpose of the secondary user authentication is "Raise the terminal device 300 so that the height of the terminal device 300 is higher by at least 50 cm than the current height".

Note that a plurality of the specific behaviors 1200 to be performed by the user for the purpose of the secondary user authentication, that is, a plurality of authentication conditions for the secondary user authentication may be set in advance, and at least one of the plurality of authentication conditions may be selected and transmitted to the terminal device 300, but when the primary user authentication is completed, the authentication condition may be randomly generated and transmitted to the terminal device 300.

That is, while a message of "Raise the terminal device so that the height of the terminal device 300 is higher by at least 50 cm than the current height" and a message of "Move to be within a distance of 2 m from the front of the third wireless communications device" of FIG. 15 may be the authentication conditions set in advance, but may be the authentication condition which is randomly generated by the server device 400 for the purpose of the secondary user authentication after the primary user authentication is completed.

In addition, the primary user authentication completion message and the authentication condition message may be transmitted in at least one form of an SMS message, MMS message, SNS message, and pop-up message and displayed on the terminal device 300.

The user who views the message of "Raise the terminal device so that the height of the terminal device 300 is higher by at least 50 cm than the current height" of FIG. 17 may raise the terminal device 300 so that the height of the terminal device 300 is higher by at least 50 cm than the height of the terminal device 300 shown in FIG. 14, as shown in FIG. 18.

Then, the terminal device 300 may receive the wireless signals from the first to third wireless communications devices 600a to 600c at the location which is higher by at least 50 cm than the height of the terminal device 300 of FIG. 6, extracts second wireless environment characteristic information for the purpose of the secondary user authentication based on the received wireless signals, and transmits the extracted second wireless environment characteristic information to the server device 400.

At this point, when the primary user authentication is performed and the user raises the terminal device 300 by at least 50 cm, the terminal device 300 may immediately extract second wireless environment characteristic information after a predetermined time elapses, or the user may request extraction of the secondary wireless environment characteristic information from the terminal device 300 by clicking on the authentication condition performance completion button 1300 so that the terminal device 300 may extract the second wireless environment characteristic information.

The server device 400 which has received the second wireless environment characteristic information compares wireless environment characteristic information set based on the authentication condition and the second wireless environment characteristic information to perform the secondary user authentication and permits the secondary user authentication when the wireless environment characteristic information and the second wireless environment characteristic information coincide with each other.

At this point, the wireless environment characteristic information compared with the second wireless environment characteristic information may be set in advance according to the authentication condition. Alternatively, wireless environment characteristic information to be changed depending on the authentication condition may be predicted using the wireless environment prediction program, and the predicted wireless environment characteristic information and the second wireless environment characteristic information may be compared to perform the secondary user authentication.

Next, when the secondary user authentication is completed, the server device 400 transmits a secondary user authentication completion message to the terminal device 300.

As above, a variety of examples of the user authentication method according to the second embodiment of the present invention have been described.

Hereinafter, a user authentication method according to the second embodiment of the present invention will be described.

Figure 19:
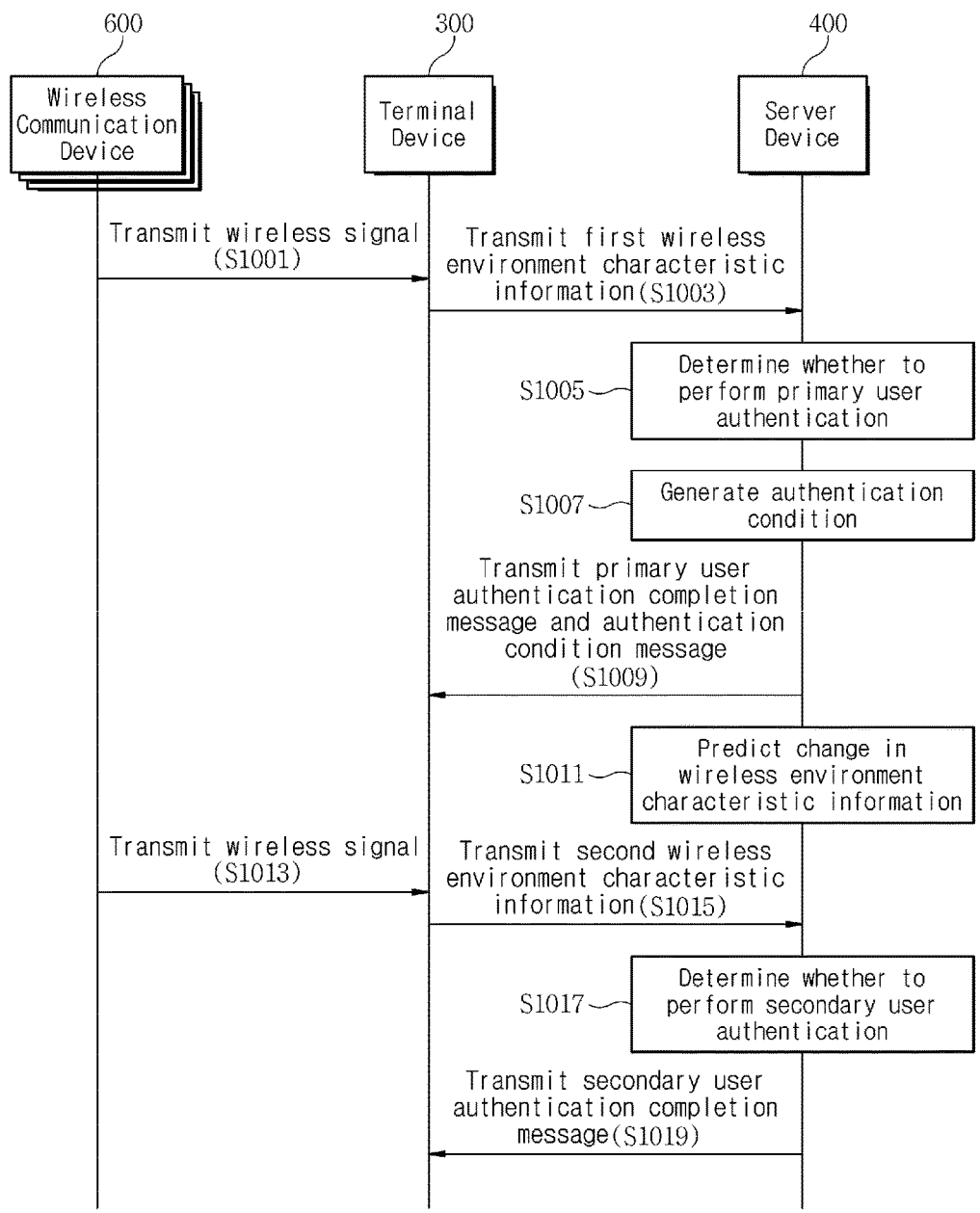
FIG. 19 is a flowchart illustrating a user authentication method according to an embodiment of the present invention.

FIG. 19 is a data flowchart illustrating a user authentication method according to the second embodiment of the present invention.

When one or more wireless communications devices 600 transmits wireless signals in operation S1001, the terminal device 300 receives the transmitted wireless signals, extracts first wireless environment characteristic information, and transmits the extracted wireless environment characteristic information to the server device 400 in operation S1003.

The server device 400 which has received the first wireless environment characteristic information may compare wireless environment characteristic information stored in advance and the first wireless environment characteristic information to determine whether to perform a primary user authentication in operation S1005 and generate an authentication condition including a specific behavior to be performed by a user for the purpose of a secondary user authentication in operation S1007 when the primary user authentication is completed.

At this point, the authentication condition may be randomly generated, or a plurality of authentication conditions may be generated in advance and stored to be selectively transmitted to the terminal device 300.

The server device 400 which has generated the authentication condition transmits the authentication condition message to the terminal device 300.

At this point, in operation S1009, the server device 400 may transmit a primary user authentication completion message together.

In addition, the primary user authentication completion message and the authentication condition message may be transmitted in at least one form of an SMS message, an MMS message, an SNS message, and a pop-up message.

Next, in operation S1011, the server device 400 predicts a change in the wireless environment characteristic according to the authentication condition transmitted to the terminal device 300 using a wireless environment prediction program.

At this point, when a plurality of authentication conditions are generated in advance and stored, the change in the wireless environment characteristic according to the authentication condition may be predicted in advance and stored and used at the time of a secondary user authentication.

When the terminal device 300 which has received the authentication condition message performs the authentication condition and then receives wireless signals transmitted by the one or more radio wave generating devices 200 in operation S1013, a second set of wireless environment characteristic information is extracted based on the received one or more wireless signals and transmitted to the server device in operation S1015.

Next, the server device 400 compares the predicted wireless environment characteristic information and the received second wireless environment characteristic information to determine whether to perform a secondary user authentication in operation S1017, and transmits a secondary user authentication completion message to the terminal device 300 in operation S1019 when the secondary user authentication is completed.

As above, the user authentication method according to the second embodiment of the present invention has been described.

Figure 20:
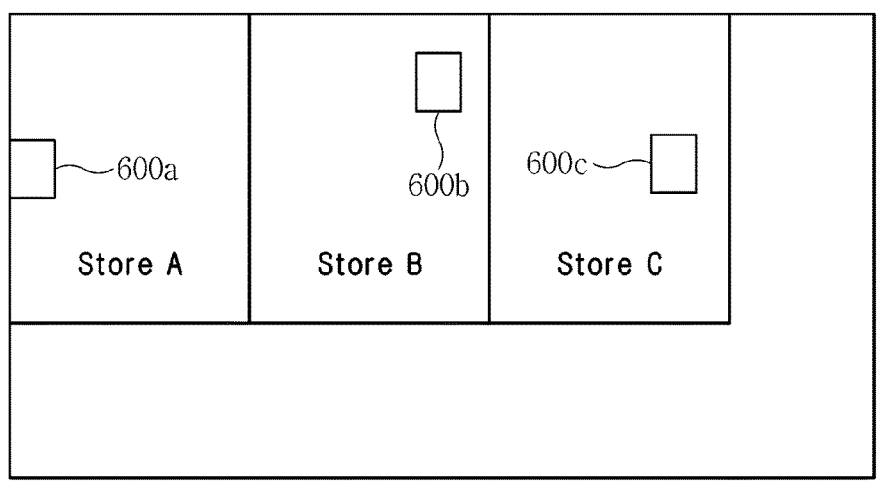
FIG. 20 is a diagram illustrating an example of performing a location registration method based on an RF fingerprint according to a third embodiment of the present invention.

FIG. 20 is a diagram illustrating an example of performing a location registration method based on an RF fingerprint according to a third embodiment of the present invention.

In FIG. 20, a specific indoor area in which a large number of stores are densely located is shown, and the stores located in the specific indoor area are generally equipped with wireless communications devices 600*a*, 600*b*, and 600*c* for providing wireless communications to users.

At this point, a user may generate a payment event in store B. The payment event is generated through an electronic payment application program included in the terminal device 300 and includes a membership or points accumulation, etc. as well as purchasing behaviors.

When the payment event is generated, payment information may also be generated. Here, the payment information generated by electronic payment may include a name, business registration number, phone number, address of the store in which the payment event is generated, payment amount, payment date and time, etc.

Of these, the name, business registration number, phone number, the address of the store are information that can be used to predict the location of the corresponding store and referred to as location related information.

The terminal device 300 may confirm the payment information generated according to the generation of the payment event and extract the location related information.

At the same time, the terminal device 300 collects wireless environment information about the wireless communications devices 600*a*, 600*b*, and 600*c* located in the vicinity of the terminal device 300. At this point, according to a distance and signal strength of each of the wireless communications devices 600*a*, 600*b*, and 600*c*, wireless environment information about the wireless communications devices 600*a* and 600*c* of the other stores, A and C, may be collected even in store B in which the payment event is currently being generated by the user.

In this case, when mapping the location related information and the wireless environment information, the terminal device 300 extracts a single piece of wireless environment information to be mapped with a single piece of location related information.

As to a method of extracting the single piece of wireless environment information, according to a first embodiment, it is possible to extract the wireless environment information with respect to one wireless communications device based on signal strength information for each of the wireless communications devices 600*a*, 600*b*, and 600*c*.

In the case of the wireless communications devices 600a and 600c located in store A or C, since the wireless signals generally pass through walls or windows or reach the terminal device 300 by bypassing outside the store when the terminal device 300 receives the wireless signals, it is common that the signal strength of the wireless communications device 600a or 600c in store A or C is weaker than that of the wireless communications device 600b located in store B. Thus, when the wireless environment information having the strongest signal strength is extracted and mapped with the location related information, the wireless environment information of the wireless communications device 600b located in store B and the location related information of store B in which payment is made becomes likely to be mapped.

According to a second embodiment of extracting a single piece of wireless environment information to be mapped with a single piece of location related information, the wireless environment information about one wireless communications device is extracted based on a similarity or an association between an SSID of the wireless environment information and the location related information.

In general, the SSID may be arbitrarily designated by a manager of the corresponding wireless communications device 600, and in the case of the store, the SSID is created to be able to identify the SSID used in the corresponding store.

Accordingly, in the case of the wireless communications device 600 of store B, the SSID may include all or part of the name of store B, and in this case, the name of store B may be determined only through the SSID, and therefore, when a character string of the SSID included in a plurality of pieces of collected wireless environment information and the store name included in the location related information are compared and a similarity and an association satisfies certain criteria, the corresponding SSID may be determined to be the wireless environment information of store B, and the SSID may be extracted.

Separately from the above-described embodiment, there may be a case in which the terminal device 300 which has generated the payment event operates a function of directly performing positioning such as GPS. When the GPS mounted in the terminal device 300 is currently operated and positioning using GPS is available although store B in which the payment event is generated is located in the indoor area, the terminal device 300 may map location information on which positioning is performed by the GPS when the payment event is generated with the position related information and wireless environment information together. Thus, a more accurate location including latitude or longitude may be determined as well as location estimation by the name, the address, or the like of store B.

Information generated in a manner such that the terminal device maps the location related information and the wireless environment information (additionally, location information mapping is available) is referred to as RF fingerprint information, and the terminal device 300 may transmit the RF fingerprint information to the server device 400.

The server device 400 may receive the RF fingerprint information collected by a plurality of users, and at this point, the RF fingerprint information may include the location related information and the wireless environment information for the location related information, and therefore an RF fingerprint map for location identification for each store may be constructed. The RF fingerprint map may be provided in the form of an actual map but may also be provided in the form of a set of texts simply representing the wireless communications device for each store or a database.

Referring to FIG. 20, one or more users may generate a payment event in store B so that one or more pieces of RF fingerprint information on which information indicating that the wireless communications device located in store B is 600b is mapped may be transmitted to the server device 400. The server device 400 may compare the store name or store address included in the location related information within the RF fingerprint information with information stored in another database (map data in which address is recorded and the like) constructed in advance to determine a more accurate location of store B, and construct a specific RF fingerprint map.

When the server device 400 receives a plurality of pieces of RF fingerprint information, there may be a case in which mutually different pieces of wireless environment information is mapped with the same location related information. Although the wireless environment information about one wireless communications device is extracted and mapped with the location related information according to the above-described embodiment, there may a case in which the output of the wireless communications device 600c of store C temporarily increases or the wireless communications device 600b of store B temporarily does not operate. In this case, the signal strength of the wireless communications device 600a or 600c of store A or C may be stronger than that of the wireless communications device 600b of store B although the payment event is generated in store B by the user, and in this case, the location related information about store B and the wireless environment information about the wireless communications device 600a or 600c of store A or C may be mapped and transmitted to the server device 400.

When receiving the RF fingerprint information in which mutually different pieces of wireless environment information is mapped with the single piece of location related information, the server device 400 may use a method for registering a single wireless communications device.

Such a method may be provided in consideration of a collection frequency or collection time of the RF fingerprint information, and when the number of pieces of wireless environment information about the wireless communications device 600b is large among a plurality of pieces of wireless environment information mapped with the location related information about store B, the wireless communications device 600b may be determined to be located in store B, and the RF fingerprint map may be constructed.

Alternatively, a plurality of pieces of the RF fingerprint information in which wireless environment information about another wireless communications device (not shown) is mapped with the location related information about store B are provided until a specific time or when a plurality of pieces of wireless environment information about the wireless communications device 600b are provided for a recent predetermined period of time from the present, the wireless communications device of store B may be determined to have been replaced so that the wireless communications device 600b may be determined to be located in store B, and the RF fingerprint map may be registered.

As above, the location registration process based on the RF fingerprint according to the embodiment of the present invention has been described with reference to FIG. 20.

Figure 21:
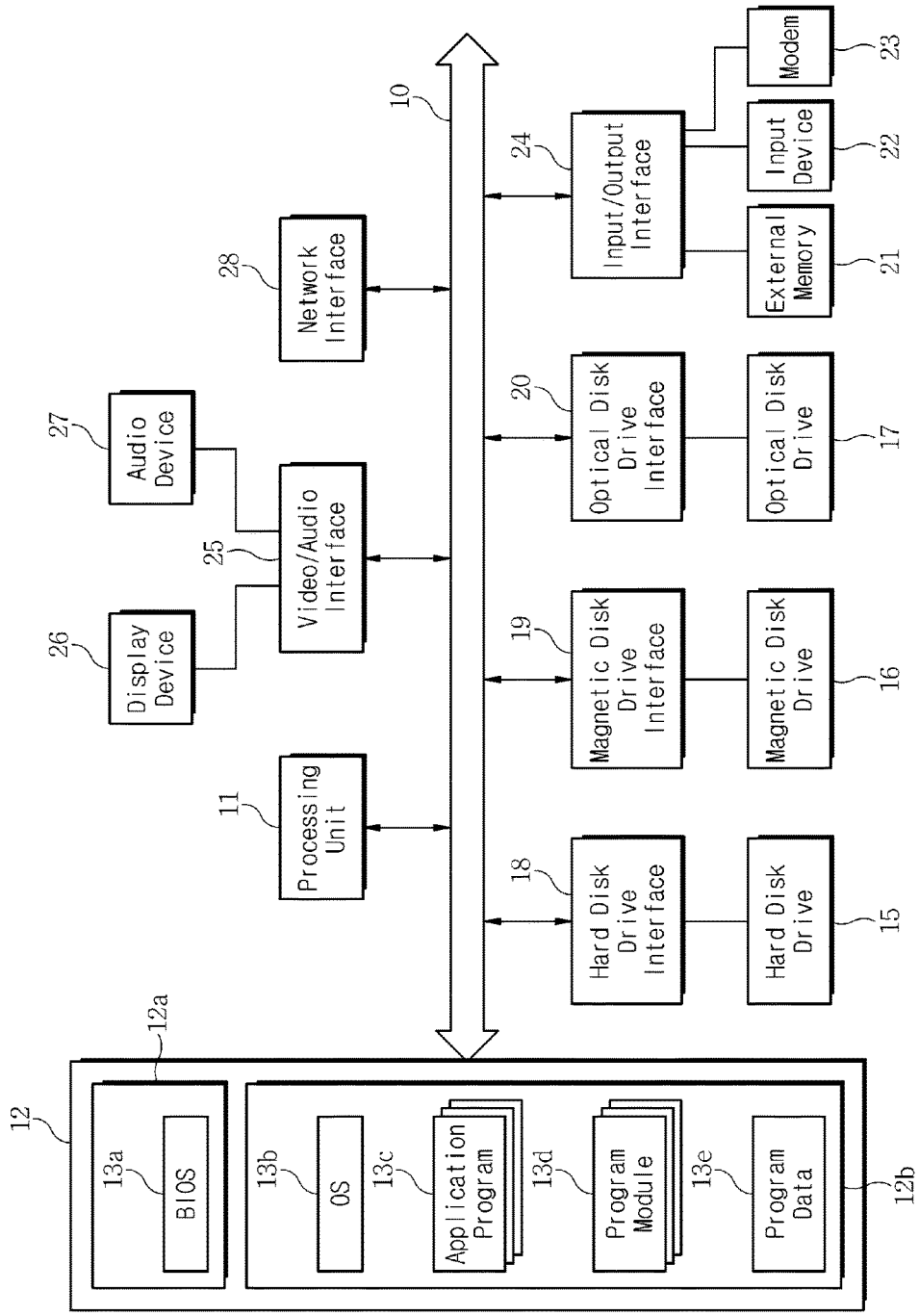
FIG. 21 is a diagram illustrating an operating environment in a system according to an embodiment of the present invention.

FIG. 21 is a diagram illustrating an operating environment for a device for providing a location inquiry method in a location inquiry service system according to an embodiment of the present invention.

FIG. 21 and the following description provide a simple and general description of an appropriate computing environment in which the present invention can be implemented.

While not required, the present invention may be described in association with computer-executable instructions such as a program module executed by a computer system. In general, the program module may include routines, programs, objects, data structures, etc. which perform a specific task or implement a specific abstract data type. The computer-executable instruction, related data structure, and program module may represent examples of a program code means that executes the actions of the invention disclosed herein.

Referring to FIG. 21, an exemplary computing system implementing the present invention may include a computing device that is provided in the form of including a processing unit 11, a system memory 12, and a system bus 10 for connecting a variety of system components including connecting the system memory 12 to the processing unit 11.

The processing unit 11 may execute computer-executable instructions designed to implement features of the present invention.

The system bus 10 may be an arbitrary one of several types of bus structures including a local bus, a peripheral bus, and a memory bus each using an arbitrary one of a variety of bus architectures, or a memory controller. The system memory 12 may include a ROM (read only memory) 12a and a RAM (random access memory) 12b. A BIOS (basic input/output system) 13a including a basic routine that helps to transfer information between components within the computing system such as during a start-up may be generally stored in the ROM 12a.

The computing system may include a storage means and may include, for example, a hard disk drive 15 that reads information from a hard disk or records information in the hard disk, a magnetic disk drive 16 that reads information from a magnetic disk or records information in the magnetic disk, and an optical disk drive 17 that reads information from an optical disk such as a CD-ROM or other optical media or records information in the optical disk.

Each of the hard disk drive 15, the magnetic disk drive 16, and the optical disk drive 17 may be connected to the system bus 10 by a hard disk drive interface 18, a magnetic disk drive interface 19, and an optical drive interface 20, respectively.

In addition, the computing system may further include an external memory 21 as a storage means. The external memory 21 may be connected to the system bus 10 through an input/output interface 24.

The above-described drives and related computer-readable media which can be read and recorded by the drives may provide non-volatile storage of computer-executable instructions, data structures, program modules, and other data.

The exemplary environment described in the present invention illustrates the hard disk drive 15, the magnetic disk drive 16, and the optical disk drive 17, but in addition to these disks, different types of computer-readable media for storing data, including magnetic cassettes, flash memory cards, DVD, Bernoulli cartridge, RAM, ROM, etc., may be used.

A program code means which is loaded and executed by the processing unit 11 and includes one or more program modules including the operating system 13b, one or more application programs 13c, other program modules 13d, and program data 13e may be stored in the hard disk drive 15, the magnetic disk drive 16, the optical disk drive 17, the ROM 12a, or the RAM 12b.

In addition, the computing system may receive commands or information from a user via other input devices 22 including a keyboard, a pointing device, a microphone, a joystick, a game pad, a scanner, etc.

Theses input devices 22 may be connected to the processing unit 11 through the input/output interface 24 connected to the system bus 10. The input/output interface 24 may logically represent an arbitrary one among a wide variety of different including a serial port interface, a PS/2 interface, a parallel port interface, a USB interface, an IEEE (institute of electrical and electronics engineers) 1394 interface (that is, FireWire interface), etc. and logically represent even a combination of the different interfaces.

Further, the computing system to which the present invention is applied may further include a display device 26 such as a monitor or an LCD or an audio device 27 such as a speaker or a microphone, and these may be connected to the system bus 10 through a video/audio interface unit 25. For example, other peripheral output devices such as a speaker, a printer, and the like (not shown) may be also connected to the computing system.

The video/audio interface unit 25 may include a HDMI (high definition multimedia interface), a GDI (graphics device interface), and the like.

In addition, the computing system executing the present invention may be connected to a network such as an office-wide or enterprise-wide computer network, a home network, Intranet, and/or Internet. The computing system may exchange data with external sources such as a remote computer system, a remote application, and/or a remote database via such a network.

To this end, the computing system to which the present invention is applied includes a network interface 28 that receives data from the external source or/and transmits data to the external source.

According to the present invention, such a computing system may transmit and receive information to and from a device positioned in a remote place through the network interface 28. For example, when the computing system refers to the radio wave generating device 200 or the terminal device 300, information may be transmitted and received to and from the server device 400 through the network interface 28. On the other hand, when the computing system refers to the server device 400, information may be transmitted and received to and from the radio wave generating device 200 or the terminal device 300 through the network interface 28.

The network interface 28 may be represented by a logical combination of one or more software and/or hardware modules such as a network interface card and the corresponding NDIS (network driver interface specification) stack.

Similarly, the computer system may receive and transmit data from and to the external source through the input/output interface 24. The input/output interface 24 may be connected to a modem 23 (for example, a standard modem, a cable modem, or a DSL (digital subscriber line) modem) and receive and/or transmit data from and to the external source through such a modem 23.

While FIG. 21 may represent a suitable operating environment for the present invention, the principle of the present invention may be employed in an arbitrary system that can implement the principle of the present invention with appropriate modifications, when necessary. The environment shown in FIG. 10 is merely an example and does not represent even a very small part of a wide variety of environments in which the principle of the present invention can be implemented.

In addition, various pieces of information generated when whether the user enters the corresponding store is determined may be stored and accessed in an arbitrary computer-readable medium associated with the computing system. For example, some of such program modules and some of the related program data may be included in the operating system 13b, the application program 13c, the program module 13d, and/or the program data 13e so that they may be stored in the system memory 12.

In addition, when a mass storage device such as a hard disk is connected to the computing system, such program module and related program data may be stored in the mass storage device. In a network environment, the program modules related to the present invention or a part thereof may be stored in a remote computing system connected through the modem 23 of the input/output interface 24 or the network interface 28. Execution of such modules may be performed in a distributed environment as described above.

A number of embodiments of the present invention have been described. While this specification contains many specific implementation details, there should not be construed as limitations on the scope of any inventions or of what may be claimed, but rather as descriptions of features specific to particular embodiments of the present invention.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps are depicted in the drawings in a particular order, this should not be understood as requiring that such steps be performed in the particular order shown or in sequential order or that all illustrated operations be performed to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown or sequential order to achieve desirable results. In certain implementations, multitasking and parallel processing may be advantageous. Nevertheless, it will be understood that various modifications may be made without departing from the spirit and scope of the claimed invention.

In this specification, exemplary embodiments of the present invention have been classified into the first, second and third exemplary embodiments and described for conciseness. However, respective steps or functions of an exemplary embodiment may be combined with those of another exemplary embodiment to implement still another exemplary embodiment of the present invention.

INDUSTRIAL APPLICABILITY

The present invention relates to an RF (radio frequency) fingerprint-based user authentication method, an approaching user detection method, a location registration method, and an apparatus for the same, and to a method and apparatus for calculating the extent of the approach to a terminal device of a user who possesses a radio wave generating device according to a first embodiment of the present invention, to a method for increasing security and reliability of user authentication by performing a primary user authentication using RF fingerprint information and then performing a secondary user authentication through a prediction about a fingerprint characteristic which is changed according to the above-described behavior according to a second embodiment of the present invention, and to a method of registering a location of a wireless communications device for each store by collecting the surrounding wireless environment information during making a payment by a user via an electronic means included in a terminal device in a specific store, extracting location related information included in the payment information, and generating RF fingerprint information through mapping of both sets of information according to a third embodiment of the present invention.

According to the first embodiment of the present invention, the terminal device may compare the searched two or more wireless signals and the RF fingerprint stored in advance, extract user information corresponding to one or more radio wave generating devices located within a predetermined radius, and calculate the extent of approach by the terminal device to the radio wave generating device based on the searched wireless signals and the RF fingerprint stored in advance, therefore leading excellent effects in preventing a lost child, a missing elderly, a lost companion dog, etc. by utilizing the RF fingerprint.

In particular, when calculating the extent of approach, the distance and the approach speed between the radio wave generating device and the terminal device may be calculated so that at what distance an object protected by a user of the terminal device is located and at what speed the object moves away from or approaches the terminal device may be determined, thereby effectively protecting the object to be protected.

According to the second embodiment of the present invention, a primary user authentication may be performed by comparing wireless environment characteristic information of a terminal device and wireless environment characteristic information stored in advance, an authentication condition including a specific behavior to be performed by a user may be transmitted to the terminal device when the primary user authentication is completed, and the secondary user authentication may be performed by comparing the wireless environment characteristic information set based on the authentication condition and the wireless environment characteristic information of the terminal device which has been changed by performing the primary user authentication, thereby achieving greater effects in terms of security and safety compared to the conventional fingerprint-based user authentication methods.

According to a third embodiment, when a user makes a payment or similarly behavior in a specific store, wireless environment information about wireless communications devices located in the vicinity of the specific store may be collected, payment information generated during making the payment may be confirmed to extract location related information through which the location can be deduced from the confirmed payment information, and the extracted location related information may be mapped with the collected wireless environment information, thereby easily determining the store in which the payment has been made.

In addition, the RF fingerprint information generated by the device which the user possesses may be transmitted to a server device so that the server device may perform more accurate location registration of the wireless communications device for each store based on a plurality of pieces of RF fingerprint information.

Therefore, because the present invention can contribute to the fingerprint industrial development and can actually be realized as well as have sufficient industrial possibilities, there is industrial applicability.

What is claimed is:

1. An approaching user detection method comprising:
searching, by a terminal device, two or more different types of wireless signals transmitted by a radio wave generating device using at least two different communication protocols;
comparing the searched two or more different types of wireless signals and a stored RF (radio frequency) fingerprint generated according to a combination of two or more different types of wireless signals transmitted by the radio wave generating device;
extracting user information corresponding to the radio wave generating device located within a predetermined radius from the terminal device based on the comparison result; and
calculating an extent of approach between the terminal device and the radio wave generating device corresponding to the extracted user information based on the wireless signals and the RF fingerprint,
wherein the calculating includes calculating a first distance value between the radio wave generating device and the terminal device based on the wireless signals and the RF fingerprint, and
wherein the calculating includes calculating an approach speed of the radio wave generating device based on a second distance value that is a distance value between the radio wave generating device and the terminal device calculated before the first distance value is calculated, the first distance value, and a difference of time points when the first and second distance values are calculated.

2. The approaching user detection method according to claim 1, wherein the two or more different types of wireless signals include two or more of a Wi-Fi signal, a UWB (ultra-wideband) signal, an NFC (near field communication) signal, and an RFID (radio frequency identification) signal.

3. A terminal device comprising:
two or more communications circuits configured to detect two or more different types of wireless signals using at least two different communication protocols within a predetermined range from the terminal device;
a storage circuit configured to store an RF (radio frequency) fingerprint generated according to a combination of two or more different types of wireless signals transmitted by a radio wave generating device; and
a control circuit configured to:
search two or more different types of wireless signals transmitted by the radio wave generating device through the communications circuits,
extract user information corresponding to the radio wave generating device located within a predetermined radius from the terminal device based on a comparison result between the searched two or more different types of wireless signals and the stored RF fingerprint, and
calculate the extent of approach between the radio wave generating device corresponding to the extracted user information and the terminal device based on the wireless signals and the RF fingerprint,
wherein the control circuit is configured to calculate a first distance value representing a distance between the radio wave generating device corresponding to the user information and the terminal device based on the wireless signals and the RF fingerprint, and
wherein the storage circuit is further configured to store the calculated distance value between the radio wave generating device and the terminal device, and the control circuit is configured to calculate an approach speed of the radio wave generating device based on a second distance value representing a distance value between the radio wave generating device and the terminal device calculated before the first distance value is calculated, the first distance value, and a difference of time points when the first and second distance values are calculated.

4. The terminal device according to claim 3, wherein the communications circuit is configured to communicate data to and from a server device and the radio wave generating device, and the control circuit configured to store the RF fingerprint in the storage circuit after receiving the RF fingerprint according to the combination of the two or more wireless signals transmitted by the radio wave generating device through the communications circuit from the radio wave generating device or the server device.

5. The terminal device according to claim 3, wherein the two or more different types of wireless signals include two or more of a Wi-Fi signal, a UWB (ultra-wideband) signal, an NFC (near field communication) signal, and an RFID (radio frequency identification) signal.

* * * * *